United States Patent
Zhuk

(10) Patent No.: US 7,032,006 B2
(45) Date of Patent: Apr. 18, 2006

(54) DISTRIBUTED ACTIVE KNOWLEDGE AND PROCESS BASE ALLOWING SYSTEM ELEMENTS TO BE SHARED WITHIN A COLLABORATIVE FRAMEWORK

(76) Inventor: Jeff (Yefim) Zhuk, 11191 E. Ida Pl., Englewood, CO (US) 80111

( * ) Notice: Subject to any disclaimer, the term of this patent is extended or adjusted under 35 U.S.C. 154(b) by 867 days.

(21) Appl. No.: 09/770,729

(22) Filed: Jan. 26, 2001

(65) Prior Publication Data

US 2001/0044827 A1    Nov. 22, 2001

Related U.S. Application Data

(60) Provisional application No. 60/178,196, filed on Jan. 26, 2000.

(51) Int. Cl.
*G06F 15/16*    (2006.01)

(52) U.S. Cl. .................. 709/206; 709/203; 709/220; 707/9; 707/10

(58) Field of Classification Search ............ 709/200, 709/201, 203, 220; 705/35; 707/9, 10
See application file for complete search history.

(56) References Cited

U.S. PATENT DOCUMENTS

| | | | |
|---|---|---|---|
| 5,335,346 A | 8/1994 | Fabbio | |
| 5,339,403 A | 8/1994 | Parker | |
| 5,548,722 A * | 8/1996 | Jalalian et al. | 709/220 |
| 5,715,403 A | 2/1998 | Stefik | |
| 5,717,925 A | 2/1998 | Harper et al. | |
| 5,752,246 A | 5/1998 | Rogers et al. | |
| 5,892,909 A * | 4/1999 | Grasso et al. | 709/201 |
| 5,933,816 A * | 8/1999 | Zeanah et al. | 705/35 |
| 5,941,947 A | 8/1999 | Brown et al. | |
| 5,987,506 A | 11/1999 | Carter et al. | |
| 5,995,951 A | 11/1999 | Ferguson | |
| 5,999,179 A | 12/1999 | Kekic et al. | |
| 6,014,666 A * | 1/2000 | Helland et al. | 707/9 |
| 6,023,708 A | 2/2000 | Mendez et al. | |
| 6,061,717 A | 5/2000 | Carleton et al. | |
| 6,064,977 A | 5/2000 | Haverstock et al. | |
| 6,314,425 B1 * | 11/2001 | Serbinis et al. | 707/10 |

* cited by examiner

*Primary Examiner*—Ario Etienne
*Assistant Examiner*—Yves Dalencourt
(74) *Attorney, Agent, or Firm*—Dorr, Carson & Birney, P.C.

(57) ABSTRACT

A distributed active knowledge and process base incorporates multiple Distributed Object Technology Systems (DOTS) connected over a network, the Internet, or wireless media to allow multiple types of data, processes, and services (system elements) to be created and modified within the same collaborative framework, and thereby permits data to be appropriately mapped to said processes, provides and updates periodically knowledge about available system elements and their values, allows separate systems to negotiate multiple forms of collaboration, and contains sufficiently flexible levels of data security in order to foster online collaboration.

21 Claims, 21 Drawing Sheets

| Operations On Services | | Operations on Multiple Object Types | |
|---|---|---|---|
| | | Email | Task Manager |
| Open | 500 | 501 | 509 |
| New | 510 | 511 | 519 |
| Change | 520 | . | . |
| Remove | 530 | . | . |
| Bookmark | 540 | . | . |
| Show Favorites | 550 | | |
| Show Trash | 560 | | |
| Show News | 570 | | |
| Show History | 580 | 591 | 599 |
| Check/Set Access | 590 | | |

Personal & Group Operations / Group Operations

Fig. 16

Reconfigure Default Organization Fields

Field 1: [What]　　Level 2: [Where]

Field 3: [When]　　Add Item: [　]

[Save]　[Reset all Organization(s) To the Default]　[Cancel]

Empty fields will be removed from the structure

Warning: Applet Window

Fig. 17(b)

Ipserve_development Project User=Jzhuk Privileges=ReadOnly

File ViewPoint Privileges Show Options Help

Remote Admin

Oracle Database

Select Total

Jini Printer

Web Phone

Action Statement [SQL]

Action Name [select]

Interval or Condition [20 min]

Description:

Check total db size every 20 min

[Record Fields] [Delete] [Add Notification]

[Done]

EDIT/DELETE selected Action icon=null or add more to it

Distributed Processing: Conditional Notification

Cell phone request for human interaction

DISTRIBUTED ACTIVE KNOWLEDGE AND PROCESS BASE ALLOWING SYSTEM ELEMENTS TO BE SHARED WITHIN A COLLABORATIVE FRAMEWORK

RELATED APPLICATION

The present application is based on the Applicant's U.S. Provisional Patent Application 60/178,196, entitled "Distributed Active Knowledge And Process Base Composed And Managed By Integrated Collaborative Services Providing And Motivating Multi-Level Privilege Based Data And Process Sharing," filed on Jan. 26, 2000.

BACKGROUND OF THE INVENTION

1. Field of the Invention

The present invention relates generally to the field of distributed active knowledge and process bases. More specifically, the present invention discloses a system that enables multiple types of data, processes, and services to be shared within a collaborative framework over a network, the internet, or wireless media.

2. Background of the Invention

The Internet provides a unique opportunity for members of businesses, organizations, and other groups to collaborate and share information easily and efficiently. Online service networks have begun to utilize the potential of the Internet by allowing members to create collaboration groups. These groups incorporate several shared services, including bulletin board systems (BBS), email, and files, which are designed to facilitate collaboration. Users can create messages or store files, and share them with their entire group.

However, existing online collaborative services allow users to share only a limited set of data types, usually restricted to messages and files, with a rare addition of a shared organizer or other similar service. This narrows collaborative actions to a small number of fields, and introduces limitations on the scope of possible collaboration and data sharing. Though some users are satisfied with restricting their collaborative efforts to solely sharing files and sending group messages, such systems are often insufficient in scope to allow for efficient workflow in a real collaborative setting.

Existing services on the Internet also limit their collaborative structure to data objects, and exclude processes. As a result of this exclusion, the large amounts of data that can accumulate in a group knowledge base cannot be mapped to better processing methods. As the number of data objects increases, it becomes more and more difficult to utilize the information contained within them to efficiently accomplish specified goals. Current system structures do not permit users to collaboratively add unknown data type objects and a service for this type of data, modify the methods through which existing data objects are processed to best suit the goals of a group. They also preclude the creation and implementation of pre-programmed processes, services, or scenarios, for distributed processing, further curbing collaborative efficiency.

Furthermore, existing systems own and fully control their collaborative environments. This limits collaboration to a single system, and does not permit systems to share data or other system elements. Data, process, and service sharing between systems belonging to different organizations is an even more complicated issue, since there is no current way for a system to determine and specify elements appropriate for free public sharing, elements that is to be shared on a pay/per use basis, and elements that is to be exchanged for related values.

Finally, current online collaboration is limited by the willingness of users to share their data. Even in a collaborative setting, users rarely desire to make their data available to all members of their group, and make adequate security a condition for sharing information. The backbone of any online collaborative effort is security, and the current methods of assigning access privileges as a way to make specified data objects available to the appropriate viewers are inadequate. Existing systems allow limited role-based privileges for all collaborative data. A common system has limited privilege levels (in most cases two levels). In such a system, if a user's profile defines her as an 'administrator', she has read, write, and delete access to all group data. If a user is defined as a 'member', she can read and add messages, but not edit or delete existing messages. This kind of system is limiting and does not encourage data sharing, since it does not give users control over their data. Users cannot create new custom roles on the fly, cannot select who has certain kinds of access to the information they choose to share, and must provide the same level of access to all members within a privilege class.

Willingness of users to share is also limited by their knowledge of other systems elements inside and outside the user system and their values. A new mechanism is required to provide and periodically update this information inside the system and between systems.

Therefore, a need exists in the art for collaborative systems that permits increased flexibility in the types of data that can be shared, that allows data, processes, and services to be created and modified within the same collaborative framework, that permits data to be appropriately mapped to said processes, provides and updates periodically knowledge about available objects, processes, and services, and their values, allows separate systems to negotiate multiple forms of collaboration, and contains sufficiently flexible levels of data security in order to foster online collaboration.

SUMMARY OF THE INVENTION

This invention provides a system encourage Internet collaboration through an distributed active and integrated knowledge and process base (DKB), which allows multiple types of data, processes, and services to be created and modified within the same collaborative framework, that permits data to be appropriately mapped to said processes, provides and updates periodically knowledge about available objects, processes, and services, and their values, allows separate systems to negotiate multiple forms of collaboration, and contains sufficiently flexible levels of data security in order to foster online collaboration. The DKB incorporates multiple Distributed Object Technology Systems (DOTS) connected over a network, the Internet, or wireless media providing and motivating multi-level privilege based data, process and service sharing. Each DOTS provides its services to multiple users via multiple client devices connected to a server, and dynamically distributes operation processing between the server and the clients. A client can be a rich client, such as a workstation or personal computer with an HTML browser that supports a downloadable Java applet program that represents the User Interface and performs a portion of the business logic for all system operations. A client can also be a poor client such as a wireless device with a WML browser that represents the User Interface for all system operations with a set of standard functions available to the specific device type. The DOTS includes a core where system methods are defined, and system elements that include multiple type objects and services within which the aforementioned system methods are redefined for multiple type objects. These methods allow for DOTS extension or reduction, and for changes in functionality and content without modifications of the core component.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 10 is a chart illustrating the system operations for each system element.

FIG. 16 is a simplified example of a display for configuration of an organizational object.

FIGS. 17(a) through 17(d) are simplified examples of displays for configuration of a tree of remote objects and related actions.

DETAILED DESCRIPTION OF THE INVENTION

Figure 1:
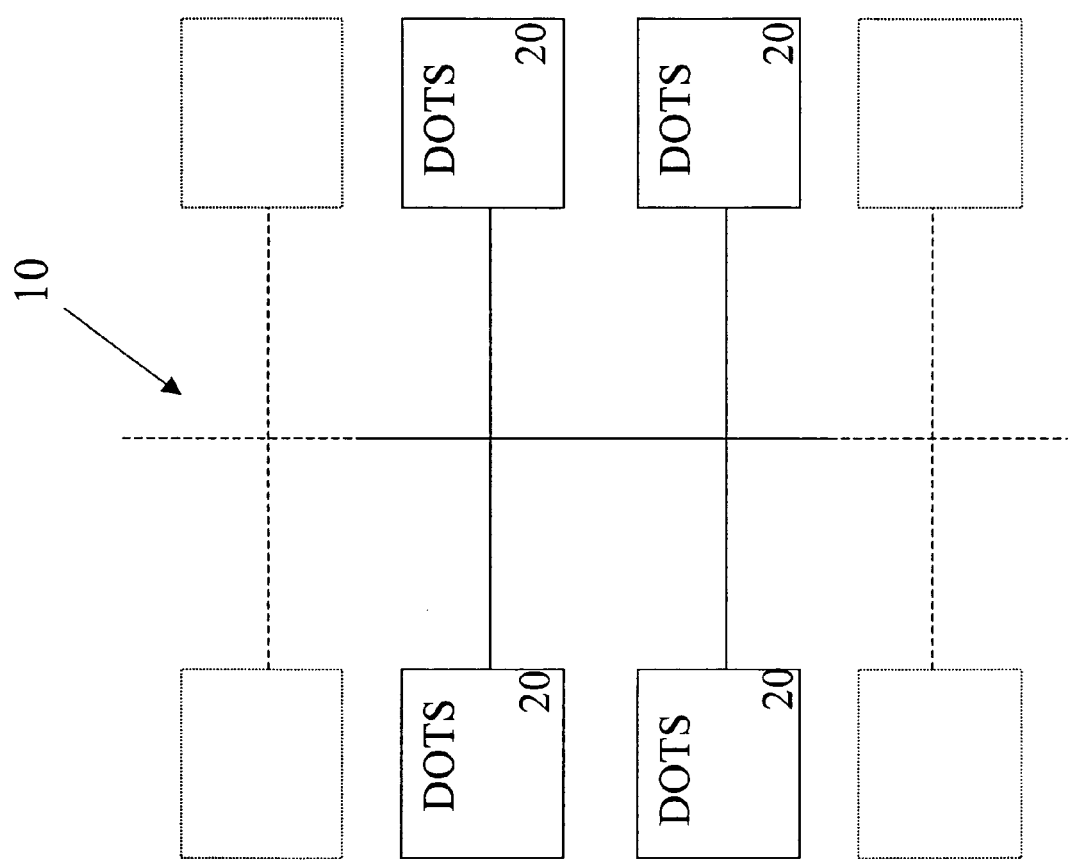
FIG. 1 is a diagram of the present distributed knowledge and process base 10 supporting a plurality of distributed object technology systems (DOTS) 20 communicating over a network.
Figure 2:
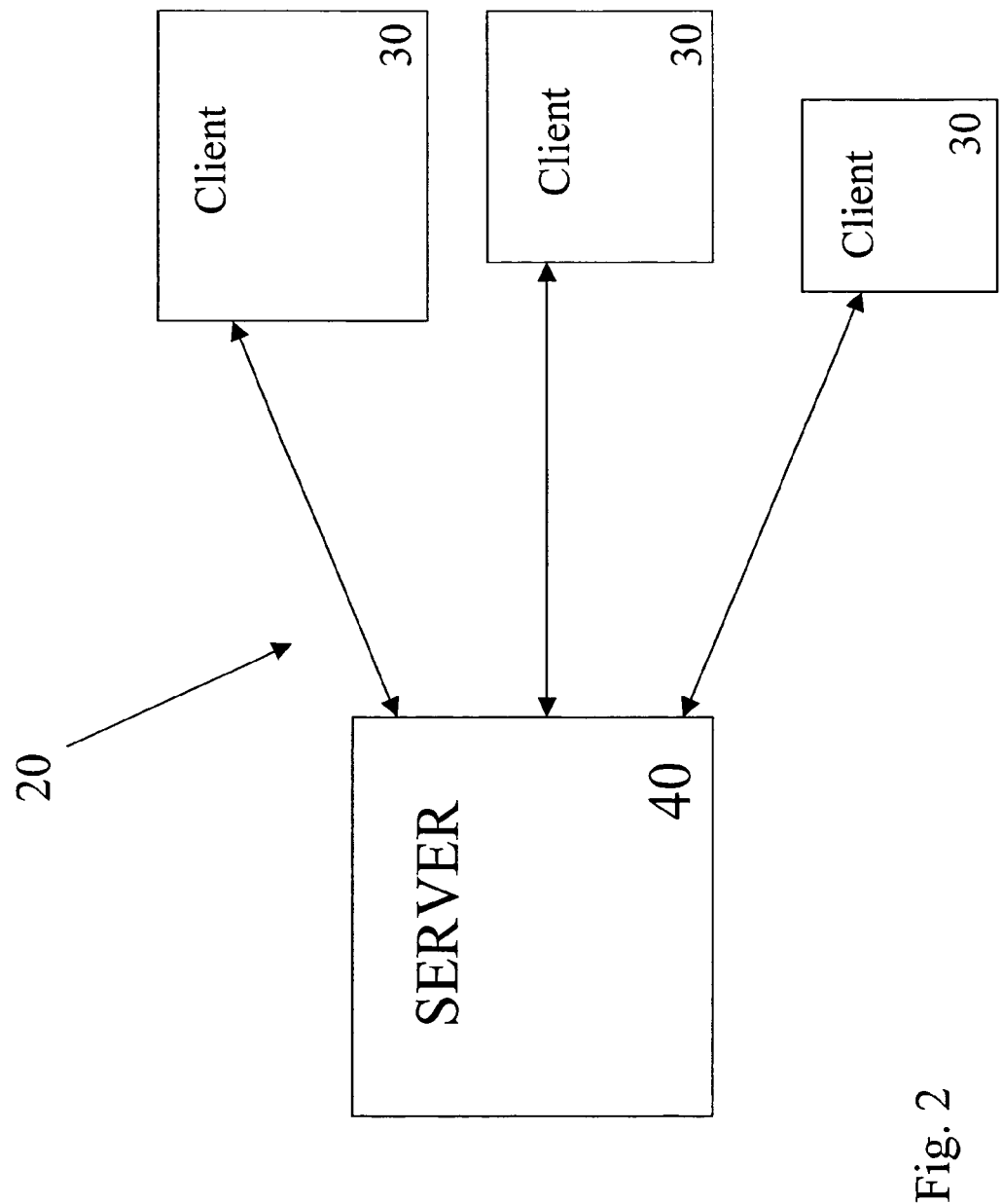
FIG. 2 is a diagram of a DOTS 20 in which a plurality of client devices 30 communicate with a server 40.

Turning to FIG. 1, the present invention consists of a distributed active knowledge and process base (DKB), which incorporates connected over the Internet or wireless media multiple Distributed Object Technology Systems. As shown in FIG. 2, each Distributed Object Technology System (DOTS) provides its services to multiple users via multiple client devices (clients) 30 connected to a server 40, and dynamically distributes operation processing between the server and the clients. A client can be a rich client, such as a workstation or personal computer with an HTML browser that supports a downloadable Java applet program that represents the User Interface and performs a portion of the business logic for all system operations. A client can also be a poor client such as a wireless device with a WML browser that represents the User Interface for all system operations with a set of standard functions available to the specific device type.

Figure 3:
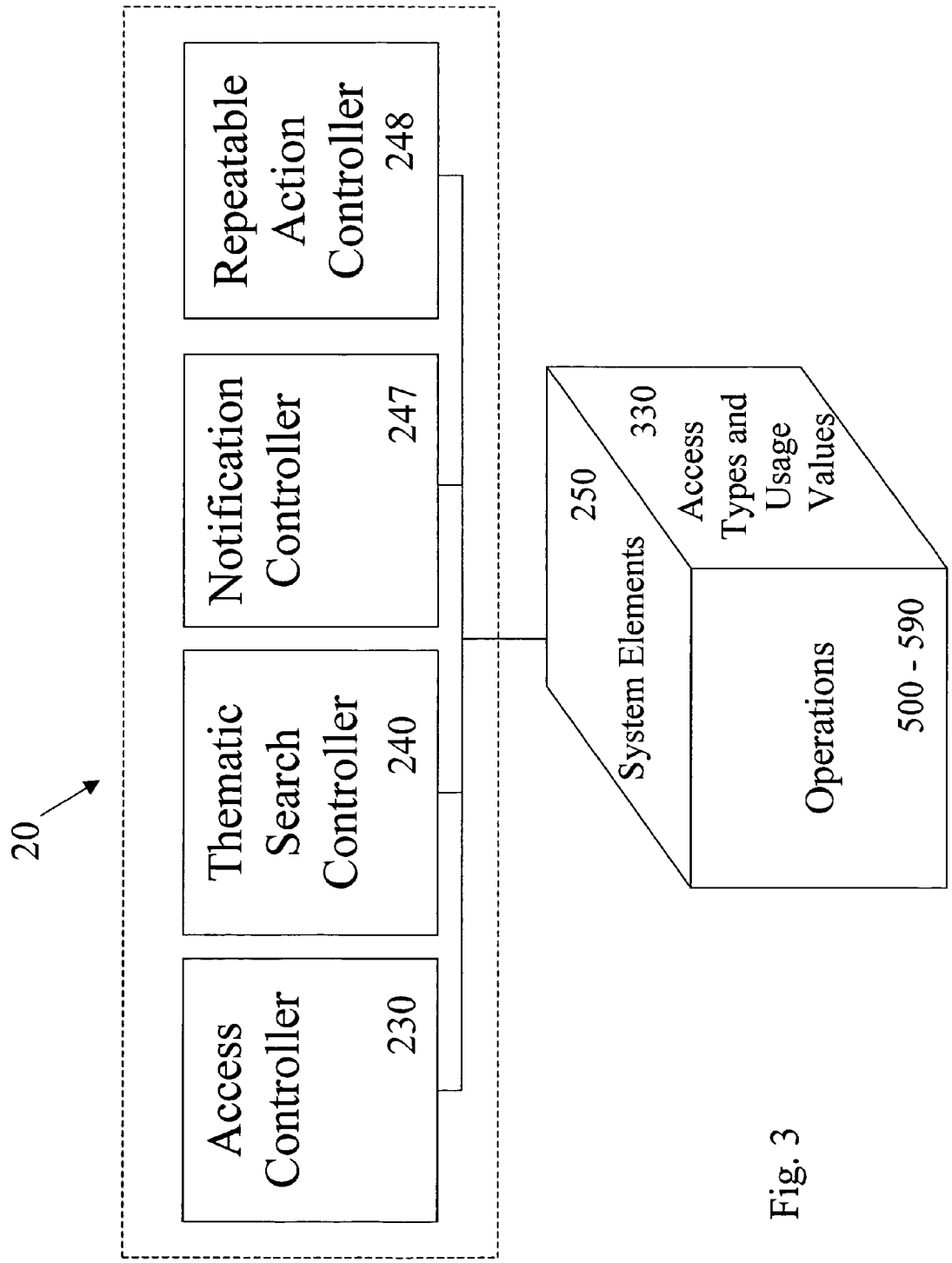
FIG. 3 is a diagram showing major components of a typical DOTS 20.

The DOTS 20 illustrated in FIG. 3 consists of the core 220 including the Access Controller 230, the Thematic Search Controller 240, the Notification Controller 247, and Repeatable Action Scheduler 248, and System Elements 250. Every system element 250 has associated Security Types, Access Levels, and Usage properties 330, as well as set of associated operations 500–590.

Figure 4:
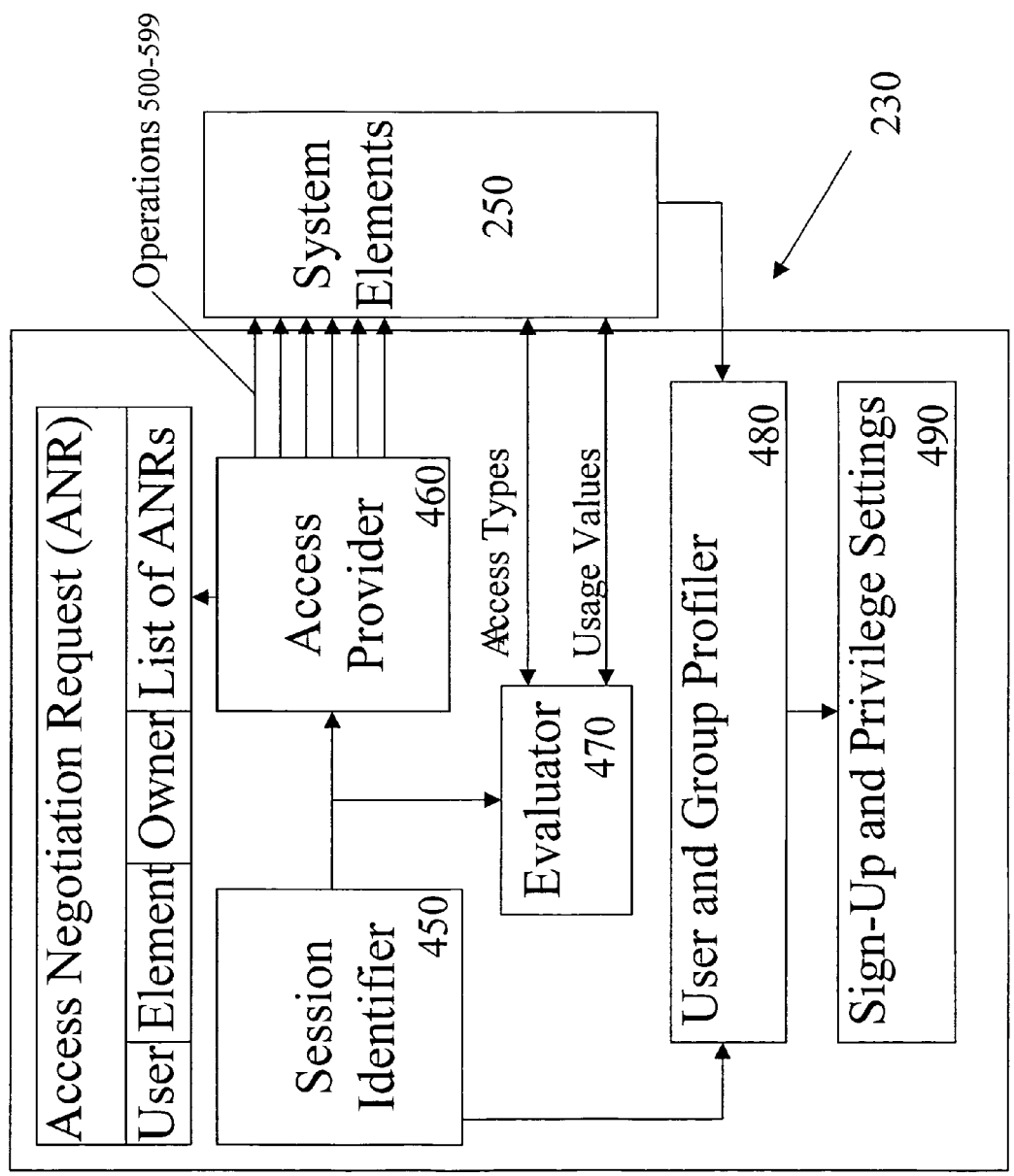
FIG. 4 is a diagram of the components of the Access Controller 230.

The Access Controller 230 in FIG. 4 includes the Session Identifier 450, the Access Provider 460, the Evaluator 470, the User and Group Profiler 480, and the Sign-Up and Privilege Settings 490 blocks. The Access Controller 230 receives a client request and sends it to the Session Identifier 450. The Session Identifier 450 requests data from the User and Group Profiler 480 that stores user and group profiles, defining security and custom features of system elements 250 for all user and group accounts. The User and Group Profiler 480 also provides initial sign-up for system users, allows group setup, and member privileges setting 490. After successful session identification the request comes to the Access Provider 460 otherwise a client request is rejected. The Access Provider 460 passes to the Evaluator 470 current user privileges and information about a system element and an operation requested. The Evaluator 470 checks Security Types, Access Levels and Usage Properties 330 assigned to the system element against the user or group (the requestor) privileges. The Access Provider 460 conducts operations 500–590 upon the requested system element 250, or creates an access negotiation request. The access negotiation request includes data describing a user or a group requesting access (a requestor); the requested system element security type, access level and usage properties and the owner; and a list of access negotiation requests (if any) by a requested system element owner toward system elements owned by the requestor.

Figure 5:
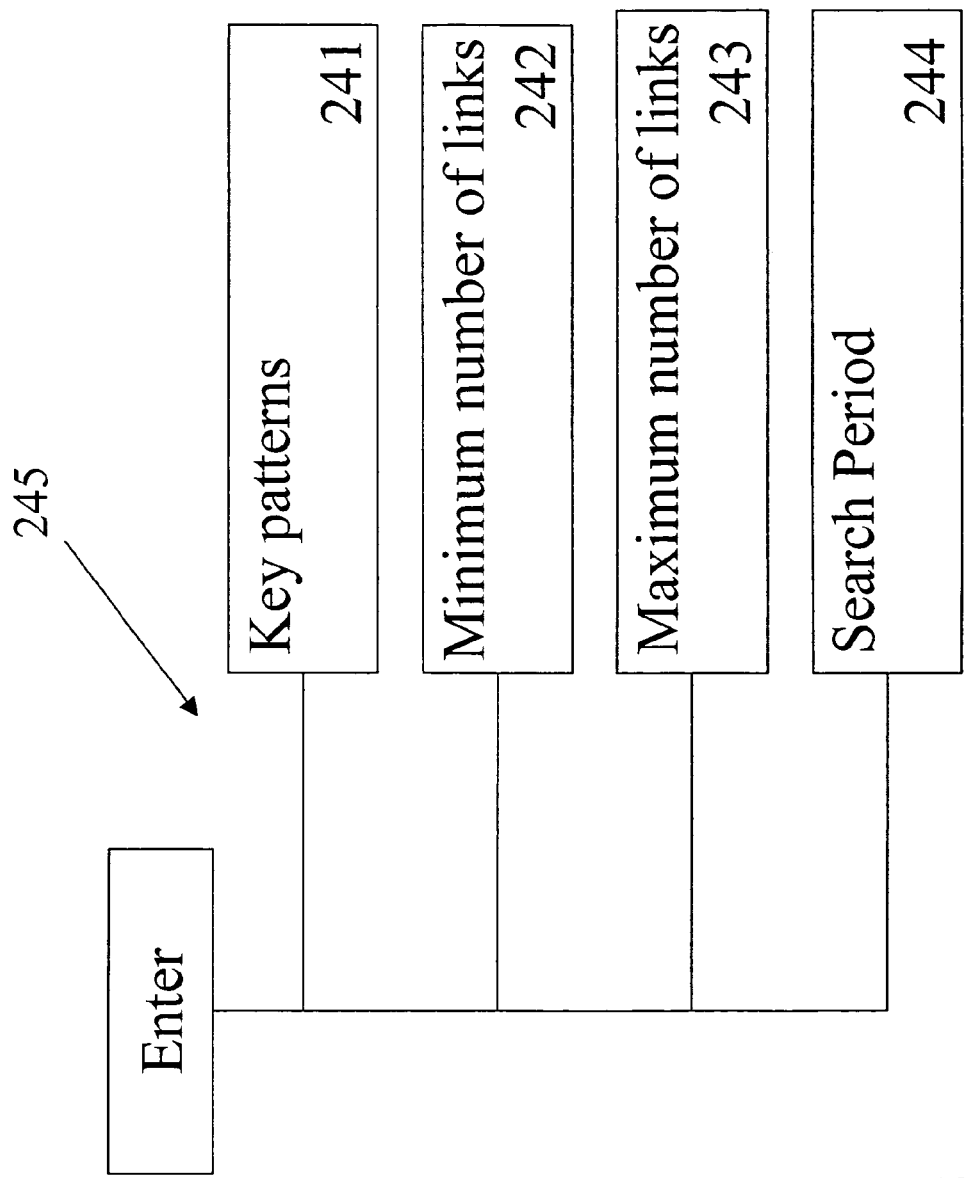
FIG. 5 is a diagram of showing the parameters that can be set for a thematic search.

The Thematic Search Controller 240 allows a group or a single user setting thematic search parameters 245, FIG. 5. A group or a user is able to enter key words 241 to set a theme, set a minimum number of links desired 242, maximum number of links allowed 243, and a search time interval 243.

Figure 6:
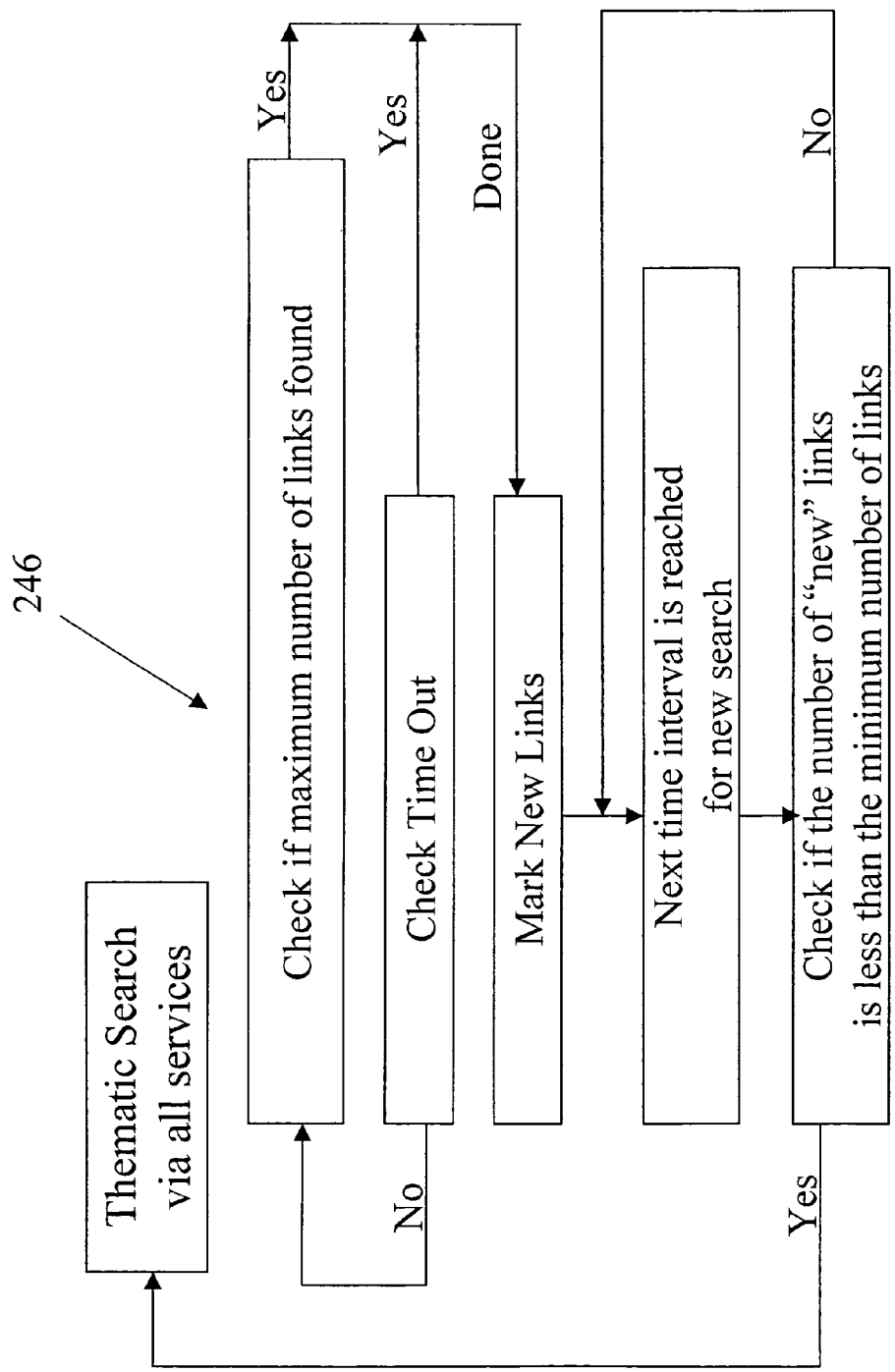
FIG. 6 is a flow diagram of the period thematic search algorithm.

The Thematic Search Controller 240 provides periodic search algorithm, FIG. 6, related to the theme inside a system (i.e., an internal search) as well as outside of a system (i.e., an external search). An internal search is conducted through all system elements 250 and results in the list of object types where objects existing within DOTS and matching key words found. The user's selection of any object from the list results in the "Opening" the object with a proper service invocation. An external search results in links to objects outside the DOTS. The links provide access to found objects in the case when it is permitted by the object access type toward the specific user, group or external system, matching object security type and usage value. Otherwise a link only indicates the object's existence and offers an "access negotiation request" link helping to start negotiation between parties. The links are marked as "new" until they are opened by a user. The search process is automatically repeated according to time period set by a user when a number of "new" links is less than the minimum of links desired 242 set by the user, and number of links found no more than the maximum number of links allowed 243.

The repeated actions scheduler 248 enables privileged users to schedule periodic operations like thematic searches. The notification block, 247, notifies users about selected events like access negotiation requests, new system elements created inside DOTS or found by the thematic search controller across DOTS, etc.

Figure 7:
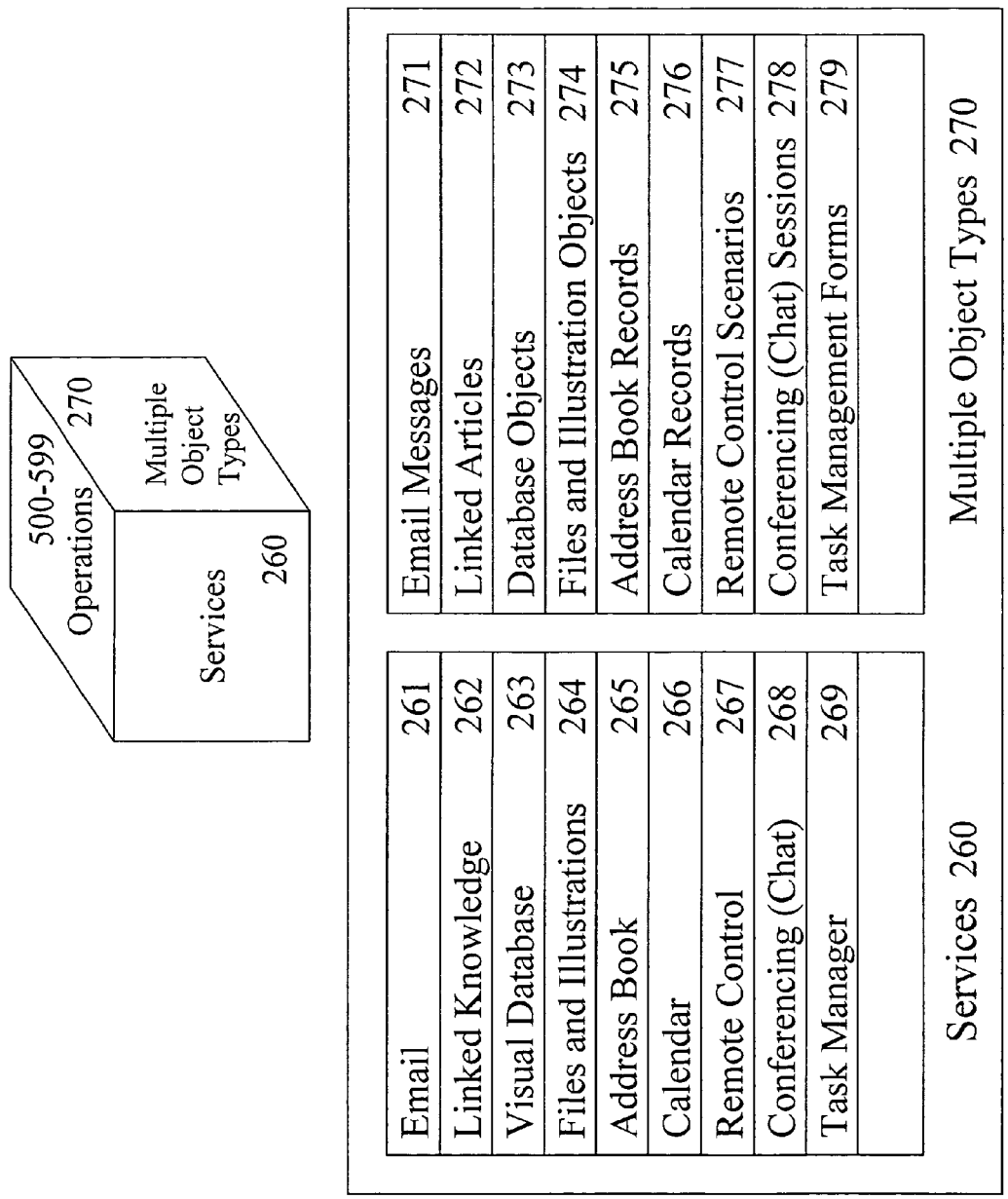
FIG. 7 is a diagram of the system elements 250.

The System Elements 250 shown in FIG. 7 include services 260, and multiple type objects 270, etc. For example, the services 260 can include E-mail service 261, Linked Knowledge service 262, Visual Database service 263, Files and Illustrations service 264, Address Book service 265, Calendar service 266, Remote Control service 267, Conference (Chat-n-Draw) service 268, Task Manager and Match-Maker service 269, etc. The services 260–269 are used to operate upon multiple type objects, 270. The multiple type objects 270 include email 271, linked articles 272, database objects 273, files and multi-media objects 274, address book records 275, calendar records, 276, remote control scenarios and executable objects 277 conference (Chat-n-Draw) sessions 278, task management and match-maker forms 279, etc.

Figure 8:
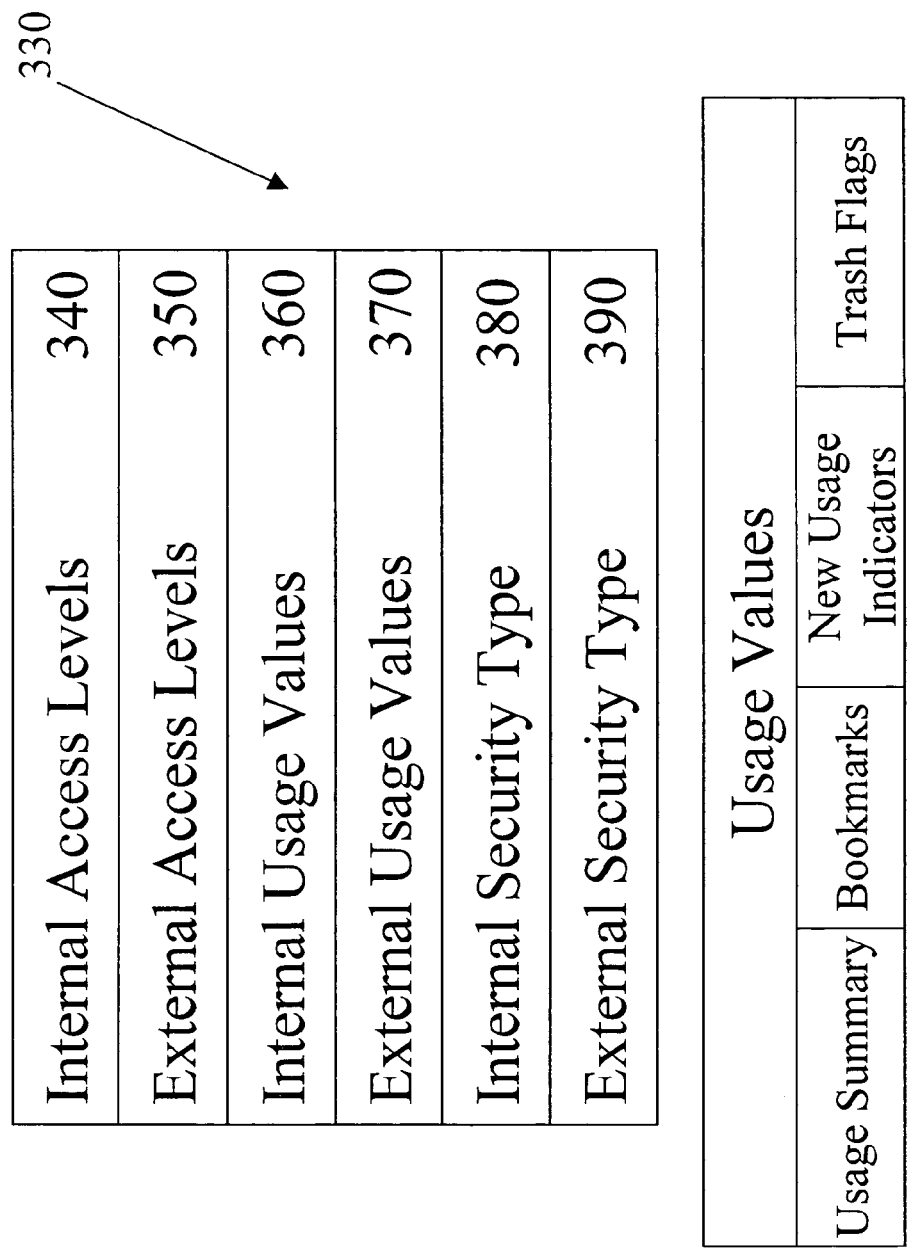
FIG. 8 is a diagram of the access levels, usage values, and security types associated with each system element.

As shown in FIG. 8, security types, access levels and usage properties (values) 330 associated with every system element include internal 340 and external 350 access types and usage values 360 defining access and values of this element for internal (to the system) groups and users, as well as for external systems.

The Access Provider 460 uses one of services 270 to access one of multiple type objects 280 in a unified way in a personal or shared (group) space, as shown in FIG. 4.

The Access Provider 460 conducts basic operations like "Open" 500, "New" 510, "Change" 520, "Remove" 530, "Bookmark" 540, "Show Favorites" 550, and "Show Trash" 560, etc., for a valid user or group account. The Access Provider 460 conducts enhanced group operations like "Show News" 570, "Show History" 580, and "Check/Set Access Types" 590, etc., for users operating in a shared (group) space. The Access Provider 460 operating in a shared (group) space evaluates a requested system element security type and access level 340 and a usage value 360 against requester name and privileges. The access type 340 can be defined as generic for users of a certain type, or specific to user name. The usage value 360 of the system element 250 is increased every time the system element is used. The additional value is default or entered by a user volunteering to grade (evaluate) the used element. Every "Bookmark" 540 operation prompts a user to grade a selected element.

Figure 9:
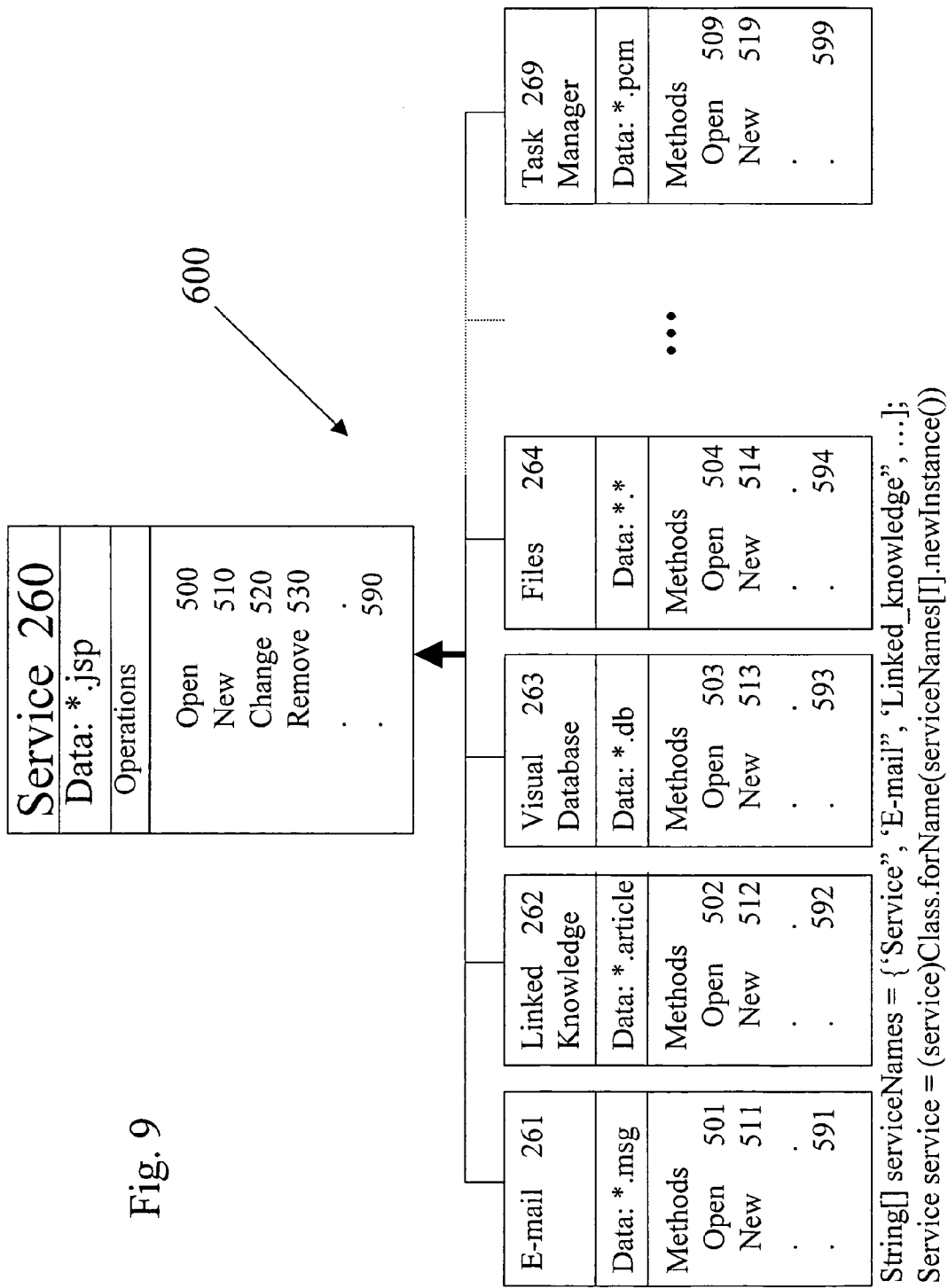
FIG. 9 is an example of an implementation of a service in Java.

The operations 500–590 are implemented in a unified way for every system element 250. The same set of operations is applied to services as well as to all multiple type objects. A selected service or multiple object type can be distinguished by a name extension. An example of an implementation is provided on FIG. 9, where a name extension is associated with a class name to be instantiated and an operation name matches a method name invoked.

In the case when one of multiple data type objects is selected the system invokes a proper service 260 providing a selected operation on a selected object. In the case when a service is selected for an operation—the operation will be done directly on the selected service, FIG. 10.

Figure 11:
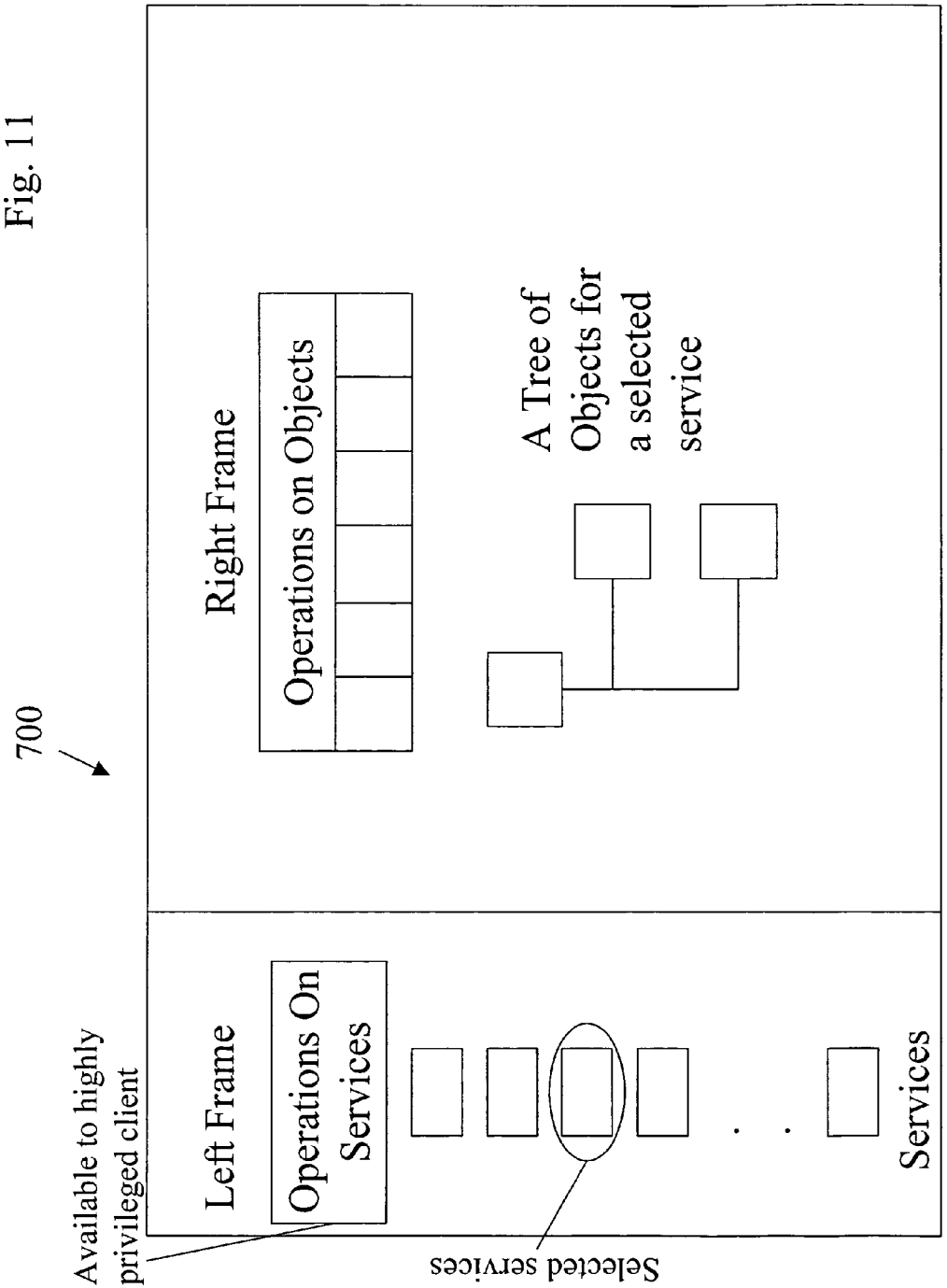
FIG. 11 is a simplified example of the display produced by opening objects for a selected service.

A Graphical User Interface (GUI) that makes system elements available to users can be implemented as a two-frame web page 700 FIG. 11. The two-frame web page 700 can display services 260 on the left and objects of a selected service on the right. Users can invoke one of services 260 (e.g., from the left frame) or access one of multiple type objects 270 (e.g., from the right frame).

The operations are illustrated below with examples of all operations, 500–590, applied to services, and several operations applied to multiple type objects.

For example, the "Open" operation 500 can be applied to a set of existing services, for example, displayed in the left frame. A selected service will display, for example in the right frame, a set of standard operations 500–590, etc., and a set of objects of a selected type as a hierarchical data tree, FIG. 11. The "Open" operation distinguishes (by color or other means) favorite (bookmark) objects. In a group space the "Open" operation also distinguishes objects created by other group members and not visited by a current user. The operations "Show Favorites" 550, "Show Trash" 560, "Show News" 570 or "Show History" 580 display only selected subset of objects, favorites, deleted, new to the current user, or all in a historical order. Once a "new" object has been open within a group space by a current user, the object status is changed; it is no longer "new" for the current user.

When a user selects an object from the data tree, FIG. 11, an "Open" method 501–509 of a proper service type 261–269 will be invoked by the system. If a selected object includes links to associated objects the "Open" operation provides an option to select and open any of associated objects. In this case a proper "Open" method 501–509, etc., will be invoked based on the type of the selected associated object, an image, sound, document, spatial (DXF, Shapes, etc.), or other type file.

Figure 12:
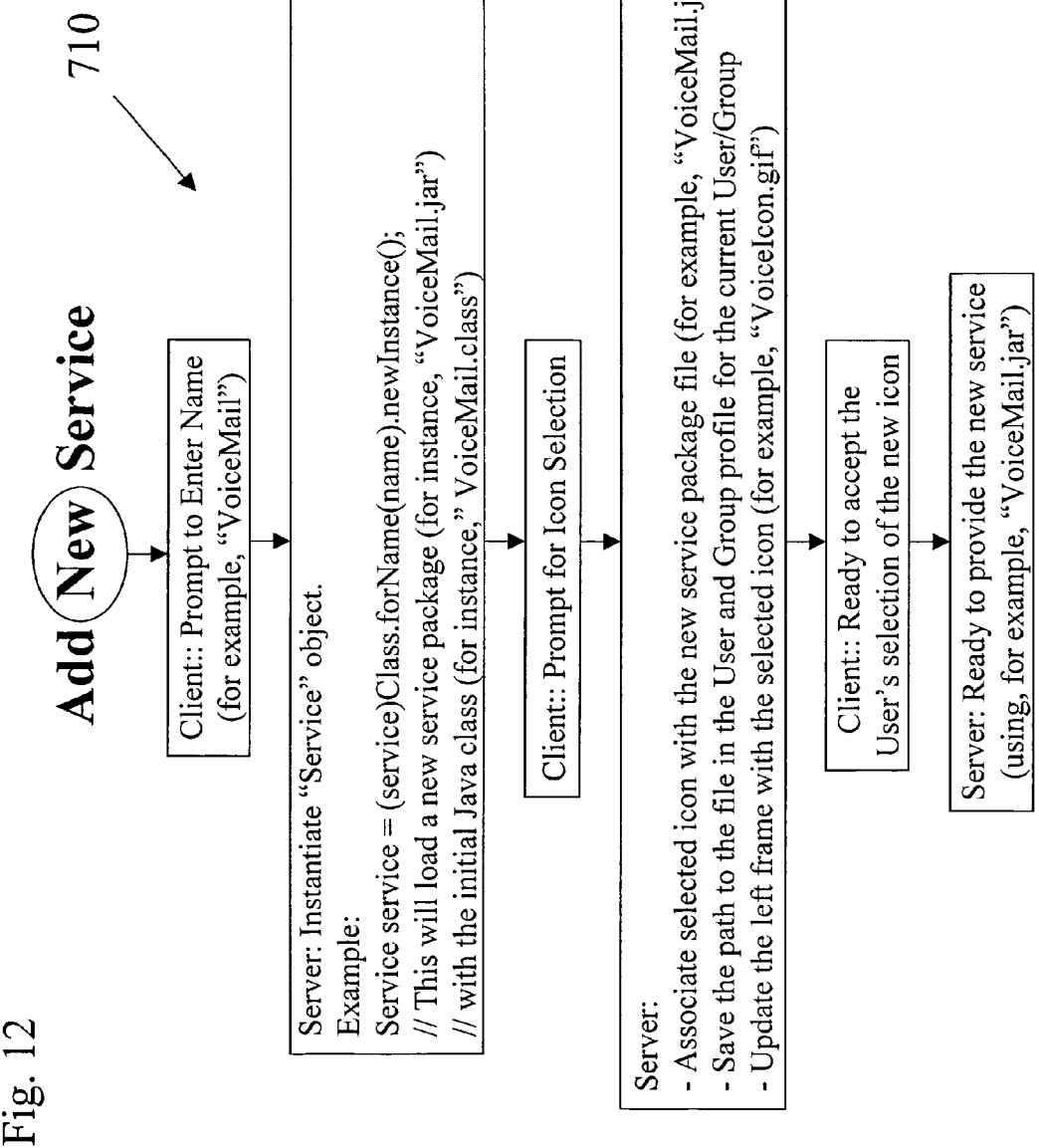
FIG. 12 is a flow diagram for adding a new service.

Another example is the "New" operation, 510. The "New" operation, 510, prompts for a new "name" then checks the name existence in the space of proper system elements and shows a warning if the name exists. FIG. 12 shows an example of adding a new service 710 where the name entered is "VoiceMail.jsp". The system will consider the name with "jsp" (Java Server Page) extension as a service name. The system will add (Upload) a new service with the "VoiceMail.jar" name to the system environment and include the service in the initial package to be used next time for the current client or a group. The "VoiceMail.jar" file includes the "VoiceMail.class" and other Java classes providing the new service appearance and operations 500–590. Then the user will get a prompt to associate a new icon on the GUI (for example on the left frame) with the service. The new service according to system rules should be associated with a new type of objects and provide the same set of operations 500–590, etc. on these objects. The Voice-Mail class as any service class must be defined as derived from the base "Service" class, FIG. 9. Service invocation will populate (for example in the right frame) a screen produced by the VoiceMail Java Service Page.

The "Change" operation 520 for a service results in customization options that can change current service appearance, customize functions for a group or a user, create and modify member roles defining subset of functions available and default access to objects served by a selected service. This operation is available only to privileged users. The result of the operation is saved into the User and Group Profiler 480.

The "Remove" operation 530 for a service removes the service permanently from the GUI and places it in the "Show Trash" basket 560.

A user can use the "Bookmark" operation 540 as well as "Show Favorites" operation 550 listing only selected services. A user can use "Show Trash" operation 560 displaying a list of removed services and offering "Restore from Trash" prompt on selected from the list service. Additional operations like "Show News" 570, "Show History" 580, and "Check/Set Access Types" 590 are available for a privileged client operating in a group space. Those operations are interpreted for services by proper methods (with the same names) invoked by the Service object 260. The "Show News" operation 570 shows new services added by different users in a group and never used by a current user. The "Show History" operation 580 shows a history of additions and removals, enable, disable, and restore operations done on services within a group. The "Check/Set Access Type" 590 operation allows privileged users to check and change current access to services for other users.

Same operations with a similar behavior are implemented via proper services on multiple object types. For example, the "Open" operation 500 on E-mail type objects 271 invokes the "Open" method 501 of the "E-mail" service 261 displaying in the right frame email messages or a selected message for a person or a group. The operation is conducted according to basic E-mail service definition (stored in the "E-mail.jar" file), and custom features related to a current user or a group (stored in the User and Group Profiler 480). The "Open" operation provides an option to select and open any of objects associated with the selected email message.

Figure 13:
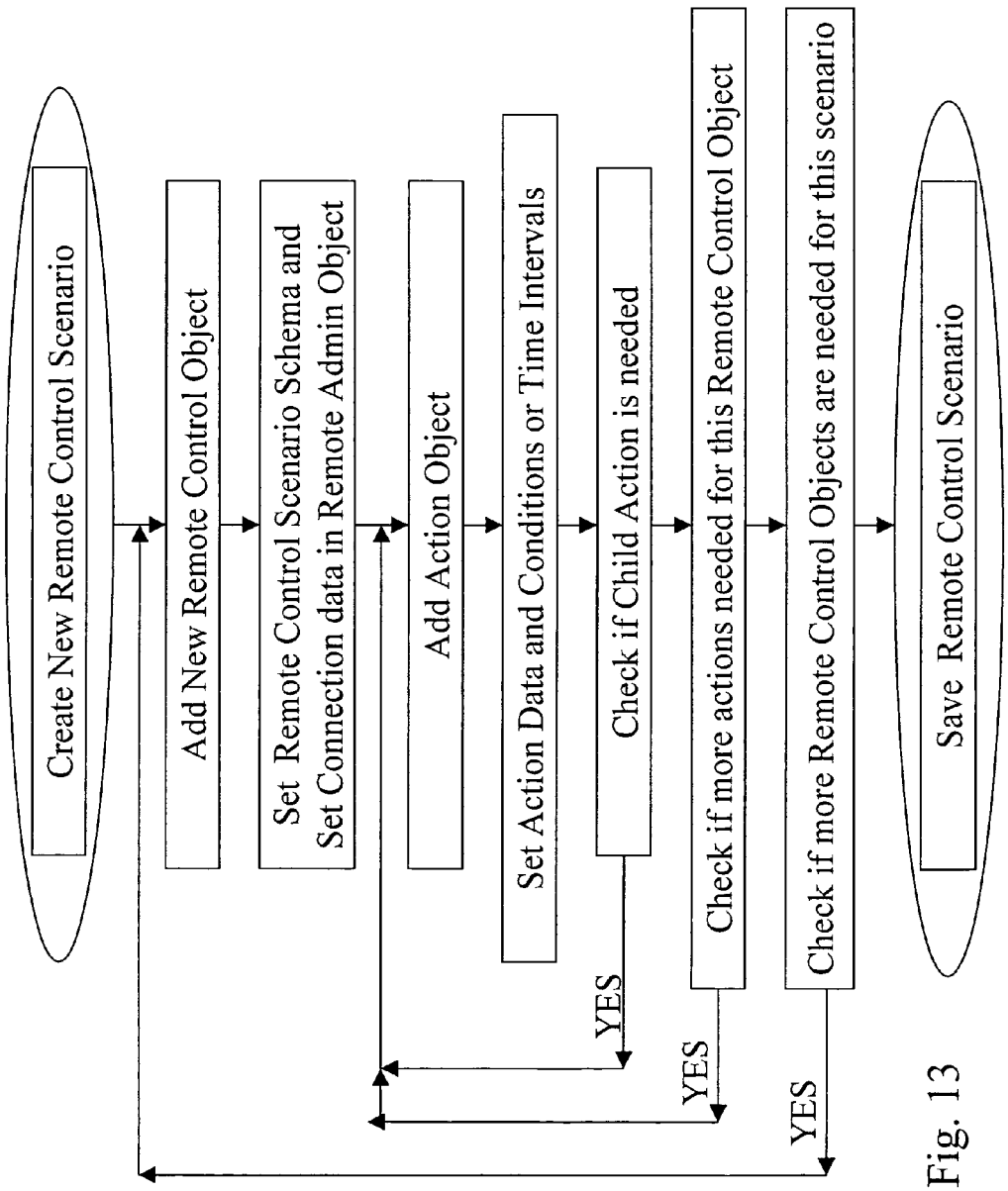
FIG. 13 is a flow diagram for creating a new remote control scenario.

The "New" operation 510 on an E-mail type object 271 results in the "New" method 511 invoked by the "E-mail" service 261 providing "New E-mail" interface, shown in FIG. 13. The "New E-mail" interface, FIG. 13, allows conveniently use personal and group Address Books 275 with the "TO" control button, use personal, groups and server name aliases with the "FROM" control button, schedule message delivery, provide message priority and notification upon delivery features.

The "Check/Set Access Type" 590 operation allows privileged users to check and change current access to a group e-mail messages for other users within a group space.

The "Open" operation 500 on a linked article 272 invokes the "Open" method 502 of the "Linked Knowledge" service 262 displaying in the right frame articles or a selected article. The operation is conducted according to basic Linked Knowledge service definition (stored in the "Linked_Knowledge.jar" file), and custom features related to a current user or a group (stored in the User and Group Profiler 480).

The "New" operation 510 on a linked article 272 will invoke the "Linked Knowledge" service with the "New" method 512 providing the interface to enter text, spell check, thesaurus, and to define page properties, like font, color, etc. A new article will automatically be linked to a currently open article. The new article appears in a group space with the default access type, for example allowing certain type users to read the object.

The "Change" operation 520 on a linked article 272 will invoke the "Change" method 522 of the "Linked_Knowledge" service 262 allows users to associate an image, sound, document, or spatial (DXF, Shapes, etc.) files to a selected linked article, as well as change existing associations.

The "Check/Set Access Type" 590 operation allows privileged users any time to check and change current access to a selected article for other users within a group space.

The "Open" operation 500 on a database object 273 invokes the "Open" method 503 of the "Visual Database" service 263 displaying in the right frame data tree or a selected data object The operation is conducted according to basic Visual Database service definition (stored in the "Visual_Database.jar" file), and custom features related to a current user or a group (stored in the User and Group Profiler, 480). The "Open" method 503 of the Visual Database service 263 provides the option to open a branch or a version of a database data tree. The "Open" operation provides an option to select and open any of objects associated with a selected data tree branch or object.

Figure 14:
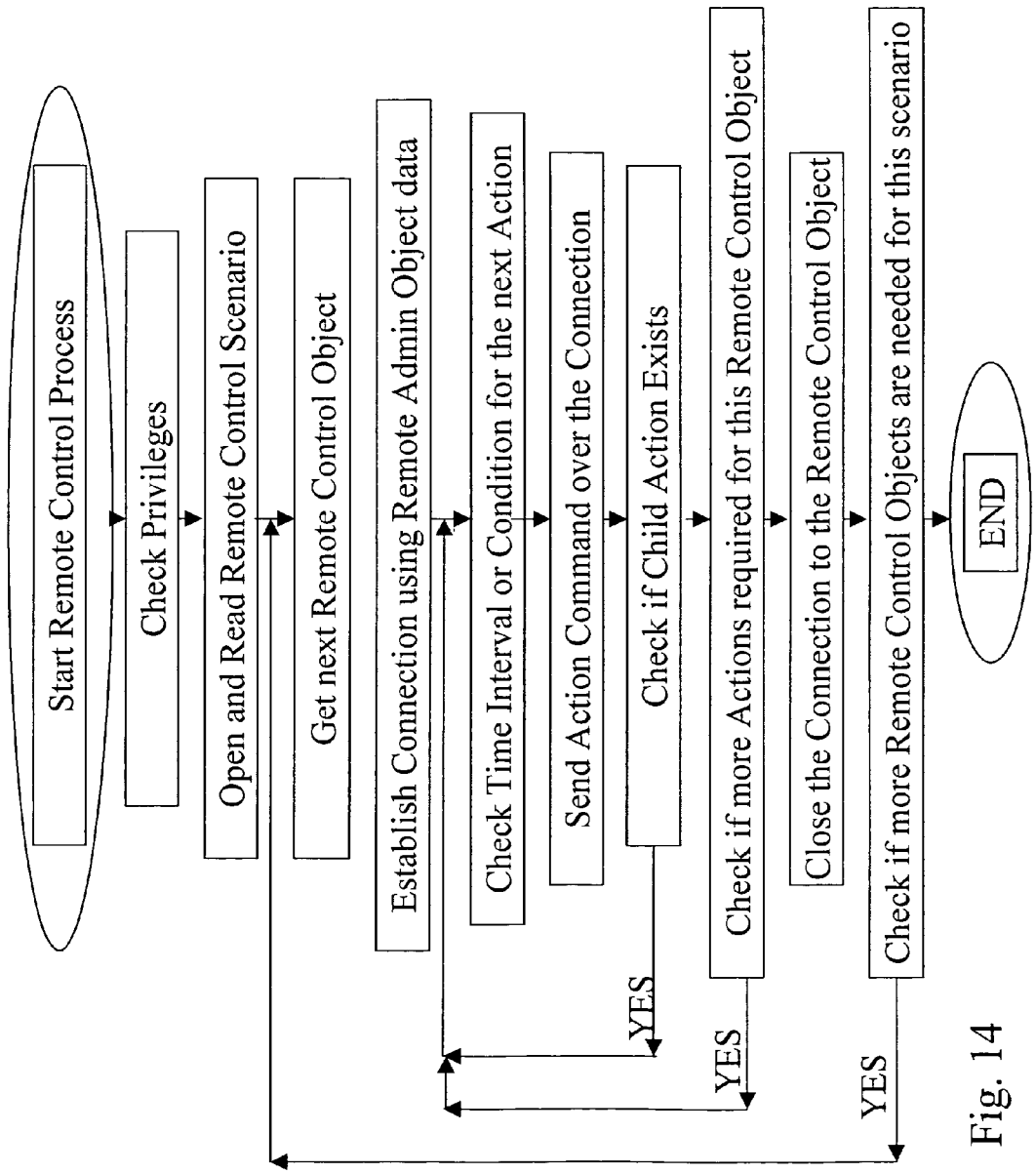
FIG. 14 is a flow diagram for starting a remote control process.

The "New" operation 510 on a database object 273 will invoke the "New" method 513 of the "Visual Database" service 263 providing the interface shown in FIG. 14 for creating a new database or database object.

The "Change" operation 520 on a database object 273 will invoke the "Change" method 523 of the "Visual Database" service 263 providing the interface, to reconfigure a database or change a database object. The "Change" method 523 of the "Visual Database" service 263 also allows users to associate an image, sound, document, or spatial (DXF, Shapes, etc.) file to a selected database object, as well as attach to another data tree, or branch it out.

The "Check/Set Access Type" 590 operation allows privileged users any time to check and change current access to the new database or database object for other users within a group space.

The "Open" operation 500 on a file 274 invokes the "Open" method 504 of the "File Manager" service 264 displaying in the right frame data tree or a selected data object. The operation is conducted according to basic File Manager service definition (stored in the "File_Manager.jar" file), and custom features related to a current user or a group (stored in the User and Group Profiler 480). A proper "Open" method 501–509 etc., will be invoked based on the type of the selected image, sound, document, spatial (DXF, Shapes, etc.), or other file.

The "New" operation 510 on a file or multi-media object 274 will invoke the "New" method 514 of the "File Manager" service 264 providing the interface to upload or create a new file or multi-media object.

The "Check/Set Access Type" 590 operation allows privileged users any time to check and change current access to the new file or illustration object for other users within a group space.

The "Open" operation 500 on address book records 275 invokes the "Open" method 505 of the "Address Book" service 265 displaying in the right frame data tree or a selected data object. The operation is conducted according to basic Address Book service definition (stored in the "Address_Book.jar" file), and custom features related to a current user or a group (stored in the User and Group Profiler 480). The "Open" operation provides an option to select and open any of objects associated with the selected address book record. A proper "Open" method 501–509, etc., will be invoked based on the type of the selected image, sound, document, spatial (DXF, Shapes, etc.), or other associated file.

The "New" operation 510 on address book records 275 will invoke the "New" method 515 of the "Address Book" service 263 providing the interface for creating a new address book record.

The "Check/Set Access Type" 590 operation allows privileged users any time to check and change current access to the new address book record for other users within a group space.

The "Open" operation 500 on calendar records 276 invokes the "Open" method 506 of the "Calendar" service 266 displaying in the right frame a calendar or a selected calendar record. The operation is conducted according to basic Calendar service definition (stored in the "Calendar.jar" file), and custom features related to a current user or a group (stored in the User and Group Profiler 480). The "Open" operation provides an option to select and open any of objects associated with the selected calendar record. A proper "Open" method 501–509 etc., will be invoked based on the type of the selected image, sound, document, spatial (DXF, Shapes, etc.), or other associated file.

The "New" operation 510 on calendar records 276 will invoke the "New" method 516 of the "Calendar" service 266 providing the interface for creating a new calendar record.

The "Check/Set Access Type" 590 operation allows privileged users any time to check and change current access to the new calendar record for other users within a group space.

The "Open" operation 500 on a process or remote control scenario, 277, invokes the "Open" method 507 of the "Remote Control" service 267 displaying in the right frame available processes and remote control scenarios. The operation is conducted according to basic Remote Control service definition (stored in the "Remote_Control.jar" file), and custom features related to a current user or a group (stored in the User and Group Profiler, 480). The "Open" operation provides privileged options to execute a selected remote control scenario, or select and open any of objects associated with the selected remote control object. A proper "Open" method, 501–509, etc., will be invoked based on the type of the selected image, sound, document, spatial (DXF, Shapes, etc.), or other associated file.

The "New" operation 510 on a process or remote control scenario 277 will invoke the "New" method 517 of the "Remote Control" service 267 prompting for user actions to create a new remote control scenario, as shown in FIG. 13, or to run an existing scenario on remote systems, as shown in FIG. 14.

Figure 15:
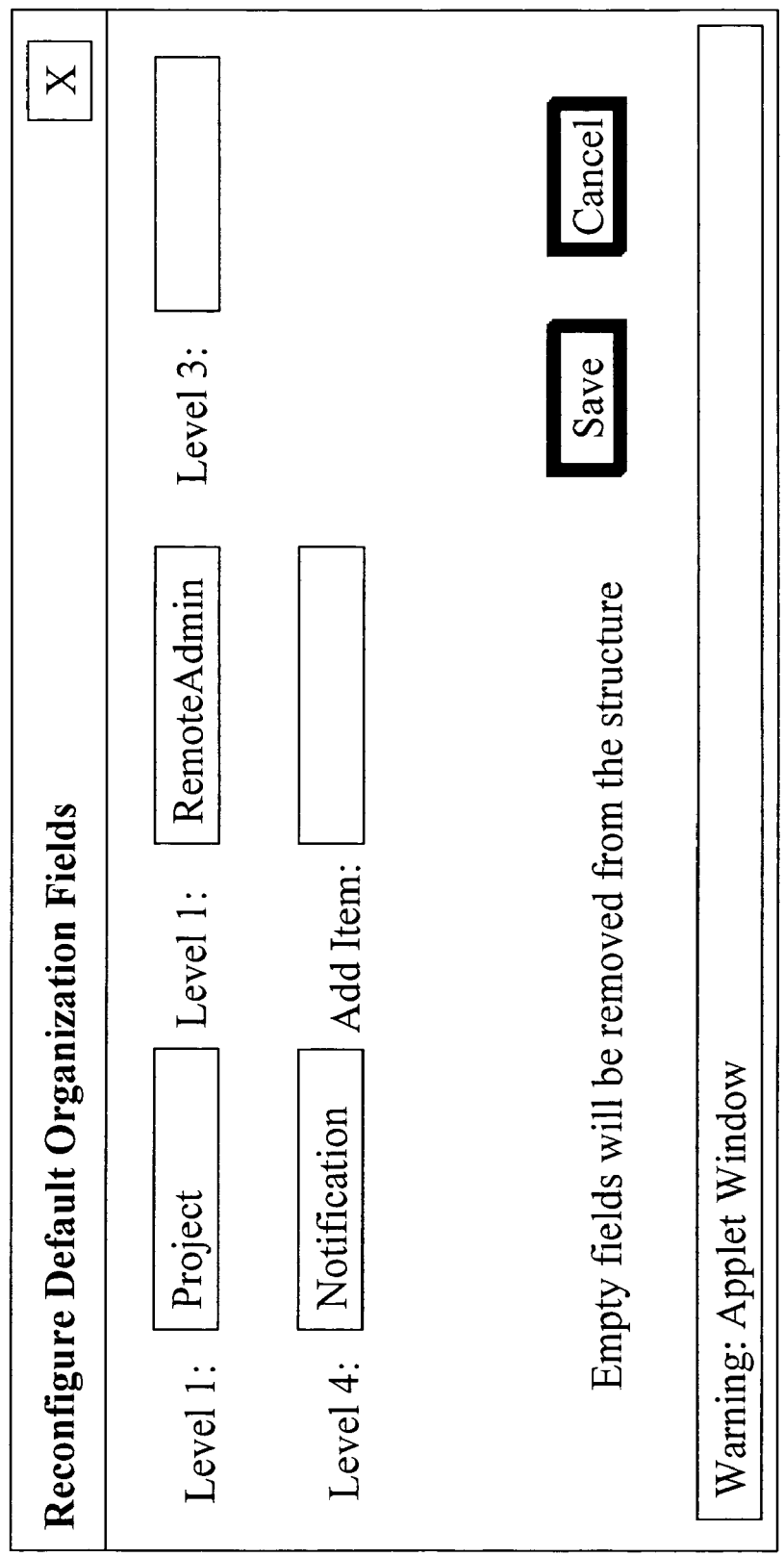
FIG. 15 is a simplified example of a display for configuration of remote control operations.
Figure 17A:
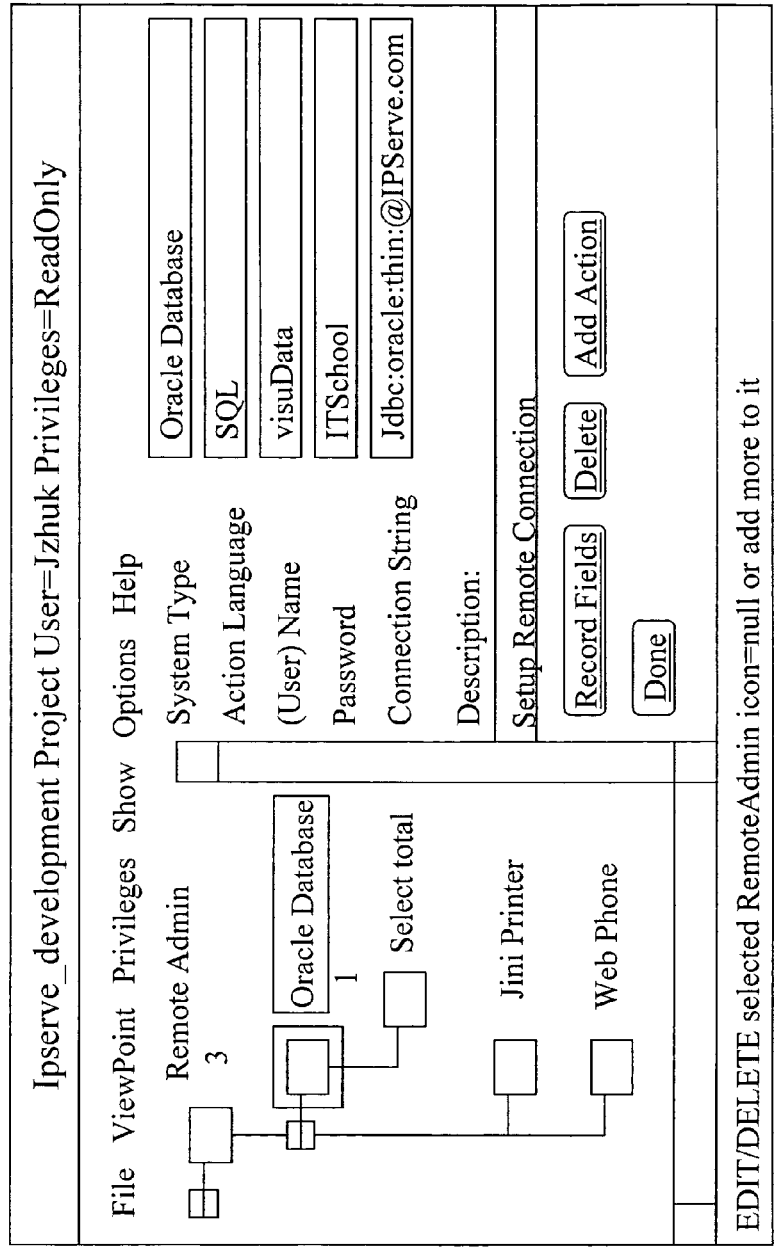
Figure 17C:
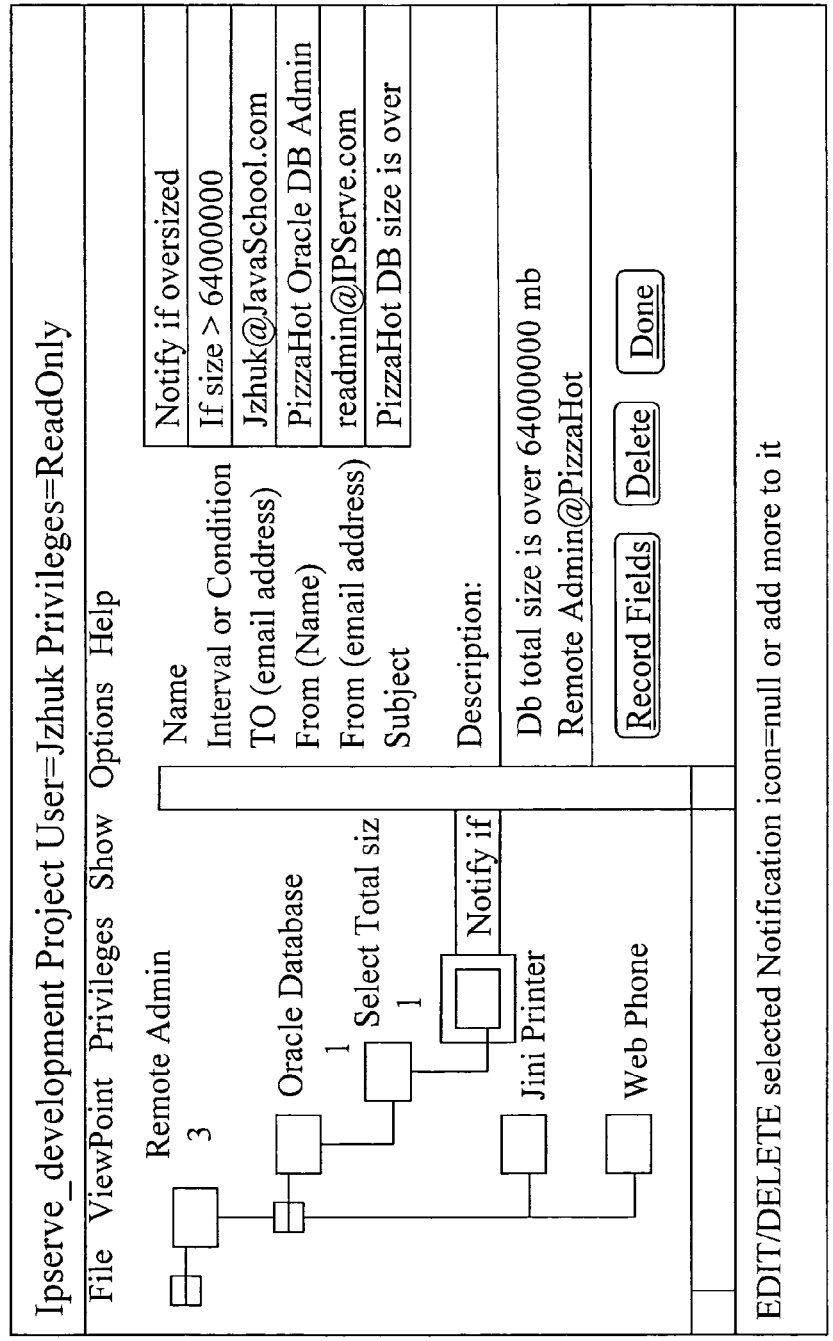
Figure 17D:
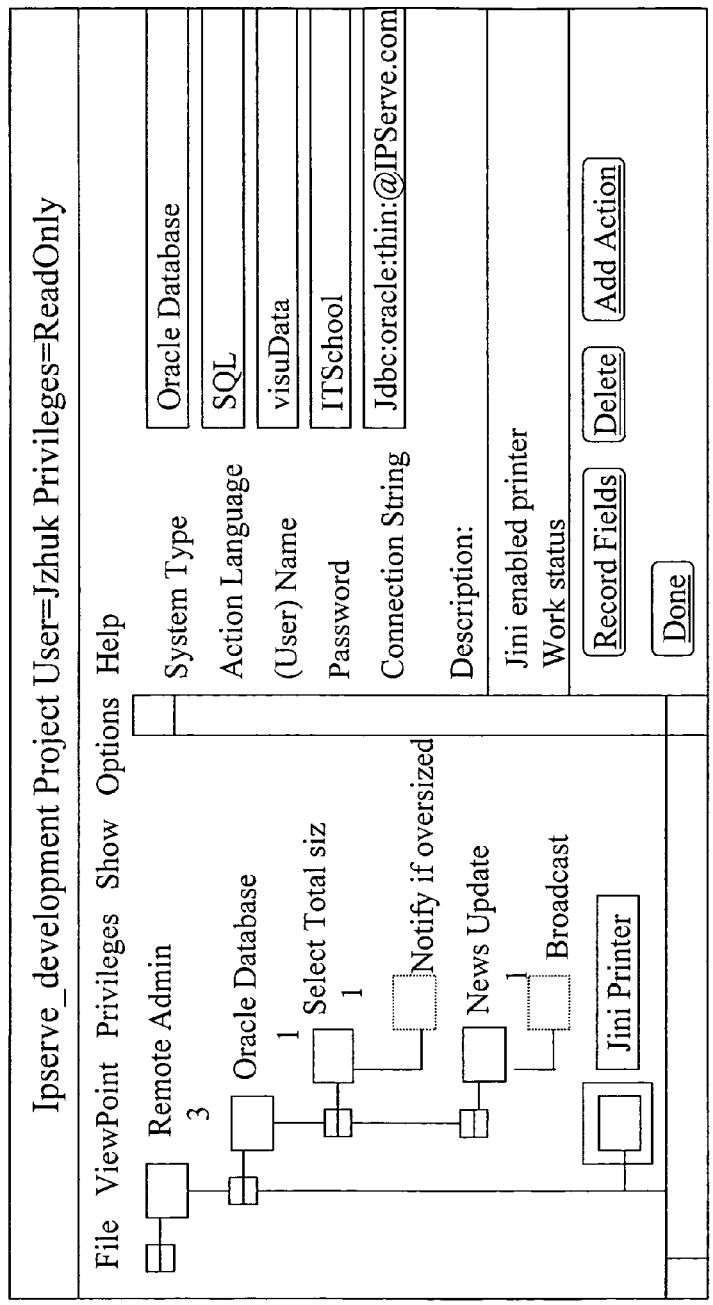

Creating a new remote control scenario, as shown in FIG. 13, consists of following steps offered by the program interface:

Add New Remote Control Object
Set Remote Control Scenario Schema and
Set Connection data in Remote Admin Object
Add Action Object
Set Action Data and Conditions Or Time Intervals
Check if Child Action is needed
If YES—Return to Add Action Object step
Check if more actions needed for this Remote Control Object
If YES—Return to Add Action Object step
Check if more Remote Control Objects are needed for this scenario
If YES—Return to Add New Remote Control Object
Save Remote Control Scenario The "Check/Set Access Type" 590 operation allows privileged users any time to check and change current access to the new remote control scenario for other users within a group space. A user who has a proper privilege can start execution of the remote control scenario where the system will take following steps (see FIG. 14):

Check Privileges and continue for privileged users only
Open and Read Remote Control Scenario
Get next Remote Control Object
Establish Connection to remote system using Remote Admin Object data
Check Time Interval or Condition for the next Action and continue when condition met
Send Action Command over the Connection
Check if Child Action Exists
If Yes—Return to Check Time Interval or Condition for the next Action
Check if more Actions required for the Remote Control Object
If YES—Return to Check Time Interval or Condition for the next Action
Close the Connection to the Remote Control Object
Check if more Remote Control Objects exist in the Scenario
If YES—Return to Get next Remote Control Object
End of Scenario An example of the Remote Control scenario created by integrated Visual Database and Remote Control services can be found on FIGS. 15–17(*a*). A user would start with configuring the basic schema for Remote Control operations, as shown in FIG. 15. Then, the Remote Admin object will be configured with fields allowing to set remote connection to the object, as shown in FIG. 16. The following steps build a tree of Remote Objects, and associated actions, as shown in FIG. 17(*a*). Every action is described in natural terms for a selected Remote System. For example, an action for a Remote System like a relational database will be naturally described in the SQL language, while an action for a Remote System like a JINI printer will be described as a JINI script, etc. The actions can be scheduled with time intervals or fired as a result of related action conditions, FIG. 20. Remote Admin objects, as shown in FIG. 16, include information about Remote Systems, like host name, port number, connecting string, user name, password, etc. The Remote Control Scenario, as shown for example in FIG. 15, can be saved in a user or group space. Then, the Access Type 340 can be assigned to the scenario 277 to allow specific users (or users with specific privileges) to execute this scenario.

Figure 18:
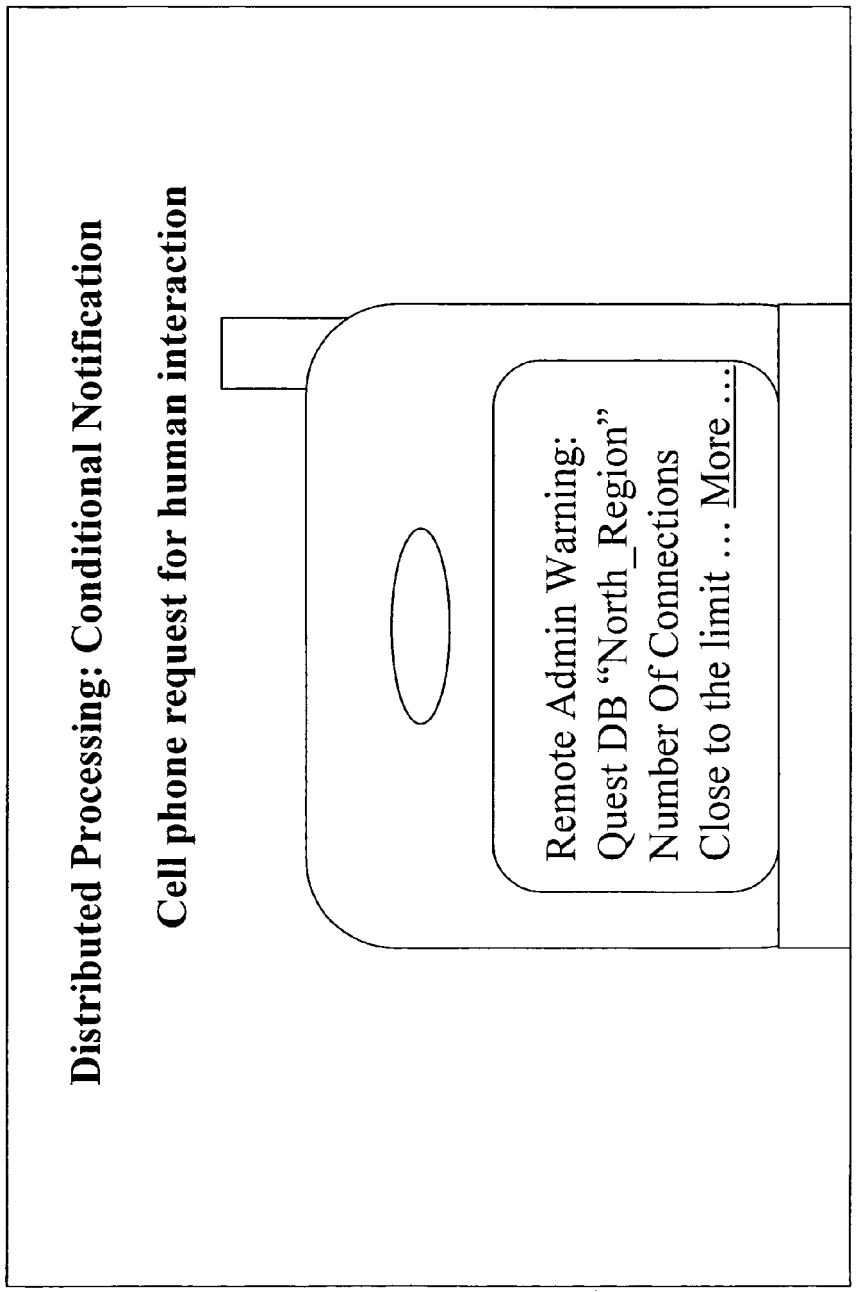
FIG. 18 is a simplified diagram showing how notification can be made via email or phone ring.

A user can select the scenario for execution by applying the "Open" operation 500 to the selected object. The Access Controller 230 will check user privileges before the "Open" method 507 of the Remote Control service object 267 can be invoked. The Access Controller 230 will check if the access type 340 of the object 277 grants permission for the current user or matches user privileges depending on specific or generic access type 340 assigned to the scenario. If permitted, the system will then execute the scenario invoking the "Open" method 507 of the Remote Control service 267. The Remote Control service 237 uses Remote Admin objects, as shown in FIG. 16, to establish connections to specified Remote Systems. Then the Remote Control service 267 executes a tree of actions, as shown in FIGS. 17(*a*)–17(*d*). The Remote Control service 267 will send action descriptions over the established connection to the Remote System for execution based on time intervals or conditions 820 provided in the scenario. One of possible actions described in the scenario can be a notification via email or phone ring, illustrated in FIG. 18.

The Conference (Chat-n-Draw) service 268 distributes text and graphical messages provided and requested by privileged clients using "Client pull" method. The messages are collected for distribution by the service on the server side. The "Open" operation 500 on a conference (Chat-n-Draw) session 278 invokes the "Open" method 508 of the "Conference (Chat-n-Draw)" service 268 displaying in the right frame available (privilege based) conference (Chat-n-Draw) sessions. The operation is conducted according to basic Conference (Chat-n-Draw) service definition (stored in the "Conference.jar" file), and custom features related to a current user or a group (stored in the User and Group Profiler 480). The "Open" operation provides an option to select and open any of objects associated with the selected conferencing session. A proper "Open" method 501–509 etc., will be invoked based on the type of the selected image, sound, document, spatial (DXF, Shapes, etc.), or other associated file.

The "New" operation 510 on a conference (Chat-n-Draw) session, 278, will invoke the "New" method 518 of the "Conference (Chat-n-Draw)" service, 268, providing the interface to create a new conference (Chat-n-Draw) session.

The "Check/Set Access Type" 590 operation allows privileged users any time to check and change current access to the new conference (Chat-n-Draw) session for other users within a group space. The interface, for example can include text and graphics areas shared by all privileged users participating in a session. The user's participation in the session is based on user privileges and session generic and user specific access types, 340. Privileged users can use "Open" operation, 500, that will invoke the "Open" method 508 of the Conference (Chat-n-Draw) service object 267 to start session recording or to open an existing record of a previously recorded session.

The "New" operation 510 on task management and match-maker forms 279 will invoke the "New" method 519 of the "Task Management and Match-Maker" service, 269, providing the interface for creating a new set of forms. The "Check/Set Access Type" 590 operation allows privileged users any time to check and change current access to the new set of forms for other users within a group space. The service allows specify primary data forms to be filled by clients, secondary data forms filled by management and defining reports and a set of actions and notifications (a workflow) based on initial data related conditions or time intervals.

The "Open" operation 500 is available for privileged (management) users. It invokes the "Open" method 509 of the "Task Management and Match-Maker" service 269 displaying initial data, statistical reports, or workflow status.

Each DOTS includes a core where system methods are defined, and system elements that include multiple type objects and services within which the aforementioned system methods are redefined for multiple type objects. These system methods allow for DOTS extension or reduction, and for changes in functionality and content without modifications of the core component. The system methods also allow users to collaboratively create and modify multiple type data objects, processes, and services.

The system methods also allow system users to create and precisely set access levels and security types to said elements for internal users, groups, and external systems. These methods enable system users to collaboratively create, change, and use (share) said system elements based on user privileges, element security type and access level; create and modify on-fly user roles defining subset of functions available, default object security type and access level.

The methods allow single or periodic internal (within a single system) and external (in other DOTS or over the Web) searches for system elements. The system methods evaluate usage of system elements, promoting favorites and assigning usage values to said elements, and also allow multiple systems to share their elements based on security types, external access levels, and usage values.

System elements include processes, services, and objects of multiple types, such as email messages, articles, databases, graphical and sound objects, address book and scheduler objects, remote control process scenarios, conference (chat) sessions, executable applications, etc. The processes can be created internally or remotely.

System services operate in a unified manner on different object types and are integrated into a set of collaborative services that can connect people, groups, and businesses in a secure environment. These collaborative services encourage data, process and service sharing over the Internet and wireless media, and map growing data sets to smarter workflow processes.

Each DOTS has the ability to set and check security type and access level to every element. Two kinds of access can be set: for internal users (group members) and for external systems. The initial default levels (privileges) are defined by user roles and security types, and can be changed precisely by assigning individual users specific access levels to specified system elements. External access types allow external systems to freely access or trade system elements with a re-evaluation procedure after every transaction.

An initial set of system elements (objects, processes, and services) is provided as a starting point, and the system allows privileged users to collaboratively increase the initial set horizontally and vertically. Here is an example of default matrix of roles and data security types with proper access levels. The available Access Types are: Owner (full access including child objects); Update (including Edit and Delete) Add (allows to add a child object); Read (read only); and No Access.

| Role/Type | Admin. | Mgmt | Member | Default | Guest | Public | Add Type |
|---|---|---|---|---|---|---|---|
| Admin | Owner | Owner | Owner | Owner | Owner | Owner | |
| Leader | Read | Update | Owner | Owner | Owner | Owner | |
| Member | No | No. | Add | Add | Update | Update | |
| Guest | No | No | No | No | Read | Read | |
| Public | No | No | No | No | No | Read | |
| Add Role | | | | | | | |

A privileged user can add a new role and a new security type on the fly and provide a matrix of access levels relating a new role to existing security types or a new security type to existing roles. A similar matrix can relate roles to functions allowed to the roles.

When an internal search is conducted, it results in links to objects existing within the DOTS, while an external search results in links to outside objects (e.g., those within other DOTS). The links provide access to found objects when access to said objects is permitted by the user's, group's, or external system's access privileges. Otherwise, the links only indicate the object's existence and offer a "access negotiation request" link to help begin negotiation between the parties. The search process is automatically repeated providing new up-to-date results.

The DOTS' integrated structure allows traditional data objects, such as message or image files, more advanced objects, such as chat sessions and web design templates (with the capability to create further object types), and processes, such as scenarios written to support specified forms of data management, to be treated collaboratively through the utilization of the same data and access structure. It also permits different systems to participate in collaborative data sharing.

This framework is the basis of an active knowledge and process base that allows collaborative users to create and manage data objects, services, and processes in the same manner. Thus, as the amount of information in a particular collaborative group increases, group members can create processes to manage this information appropriately. In the preferred embodiment, for instance, a ready-made notification process can notify selected members when a particular data object has been accessed, or when other conditions are met, by contacting a remote client such as a computer terminal, printer, or wireless device, and triggering an executable scenario. Other similar processes can be created by groups to efficiently coordinate information management and workflow in a collaborative environment.

The DKB allows for more flexible management of information, enabling the addition of data types as well as processes, or services to handle those data types. This allows for true online collaborative development, as users are not restricted to one or two types of collaborative data objects. The preferred embodiment of the system is pre-equipped with system elements (multiple processes, object types, and services), including a visual database data type, a remote control scenario, an action object, process, and service, with sufficient flexibility to add unlimited others using the same access framework.

The DOTS access structure allows role-based, security type based, and privilege-based access to all data and processes. Privileged users can create arbitrary user roles and arbitrary security types, and then create a matrix of access levels assigned to the roles accessing system elements with defined security types. All system elements have properties defining their access as well as their usage values. Access properties include security types that define access levels for user roles. Access levels can be precisely redefined by privileged users for specific individuals. Privileged users have the ability to alter access levels, and can also assign this ability to others on an individual basis. Each system element also has usage properties (usage summary value, individual or group bookmarks, new usage indicators, trash flags) that define element objective (for all users) and subjective (for individual users) values, and allows privileged members to see which users have accessed that element.

The DOTS access mechanism provides access negotiation request when a valid user or a group tries to access a system element without proper privileges. The access negotiation request includes data describing a user or a group requesting access; requested system element security type, access level and usage properties; and a list of access negotiation requests, if any, by a requested system element owner toward system elements owned by the requestor. For example, Joe tried to access the element "A" owned by Mike. This attempt resulted in the access negotiation request that included information that Mike had interest in the element "B" owned by Joe, but could not access the element "B" because of luck of privileges. Joe can notify Mike that in exchange of access to element "A" he (Joe) will allow (override) access level for the element "B" for Mike. They (Joe and Mike) can also establish rules for mutual access exchange. For example, they can provide memberships to each other with specific roles and assign specific security types to related data allowing these roles to access this data.

The DKB introduces a mechanism for periodic thematic search providing fresh information of system elements available with respect to their values and selected parameters, a repeatable action scheduler enabling users to schedule repeatable actions like thematic search, etc., a notification mechanism that notifies users about pre-selected events like access negotiation requests or specific news delivered by thematic search, etc.

Finally, the DKB permits different DOTS to negotiate system element trade based on user, group, or system access privileges and system element access type and usage value.

EXAMPLE OF DKB USAGE

Joe Smith is a member of the Stock-Research and the Alternative-Medicine groups served by the DOTS with the domain name We-Share.com. There are more than two groups served by We-Share.com.

In the Stock-Research group, Joe operates in a researcher role which allows him, by default, to not only read but also contribute to the group contents. In the Alternative-Medicine group Joe is only a participant, which that gives him the "read only" option by default. When Joe checks his account at We-Share.com, the DOTS performs an "Open" operation for a personal account displaying a brief report on personal and group objects (multiple data types, processes and services) available to Joe. Several sections appear on the screen: personal section and two group sections. Each section includes several lines. Every line reports a status on a specific type of objects and consists of two links. The first link indicates some generic information, for example a number of total objects of this type, while the second link shows news related information, for example a number of new objects never accessed by a current user.

Joe clicks first on the link "6 new email messages" related to the personal section. Then, Joe checks for new objects appeared in the Stock-Research group. He clicks on "3 new articles" link first. This click results in "Show News" operation for Linked Articles in Stock-Research group account displaying several links leading to new articles that Joe did not open before. Looking into one of the articles named "Market Value" Joe found both "New" and "Change" controls available. He decided to correct the article, pressed "Change" control and edited the text, and added illustrations.

Then Joe decided to add a sub topic to the article and pressed "New" control. He was able to create a new illustrated article that was automatically linked to the "Market Value" article. As a creator of the object Joe has full control over the object including "Set/Check Access Type" option. Joe wants to give his partner, Chris, ability to edit this article. Joe allows Jane add more sub topics to this article, and disallows Mary to see this article at all. For the rest of the group he leaves default access defined by their group roles.

Joe looks through new articles paying especial attention to their values. Joe provides his grade-evaluation for some articles adding some value to selected objects.

As one of group founders Joe has a special privilege to create and change group roles. He creates a new role "Senior Research Assistant" defining a subset of operations and default access for selected object types.

Then Joe checks new Visual Database objects as well as new Remote Control scenarios created and shared by privileged group members. He finds one of scenarios very interesting and decided to copy it with slight modifications for his own usage. Inspired by the "Market Value" article Joe decided to create a trade on-line scenario based on described in the article strategy and criteria. He described a remote object as E-trade site and set a connection string providing access to the site. Then Joe described an action upon the remote object as periodic selection of current stock market values and comparison with previously stored values. Joe added a conditional action that happens if comparison meets some criteria. The conditional action will initiate one of trade transactions: buy or sell depending on criteria met. Joe introduced a special condition in the scenario upon which a call will be initiated to his cellular phone and via WAP technology he will be able to reach a proper Web page and personally drive the transaction. Joe set timing for the scenario as daily operation starting with New York stock exchange opening with 20 minutes interval till closing. Joe placed his scenario to his personal space decided that it is not the best thing for sharing.

Joe looked into the Thematic Search Results section and found several objects there. His search topic was "Home Security Systems". Most of objects were found outside of the We-Share.com DOTS. The links invited him for negotiation sessions providing access negotiation requests. Only one found object was available. It was also a link to another DOTS but apparently the value of the object was comparable to one Joe shared. The link allowed Joe to open a "Secure Your House" remote control scenario available from Smart-And-Secure.com DOTS. Then Joe took a close look at the access negotiation requests. They included requested system element "A" properties; name of the owner, it was Mike, and a list of access negotiation requests Mike had towards system elements owned by Joe.

Mike wanted to access the element "B" owned by Joe, but had not enough privileges. Joe immediately notified Mike that in exchange of access to element "A" he (Joe) will allow (override) access level for the element "B" for Mike. Then Joe suggested to Mike to establish rules for mutual access exchange. For example, they can provide memberships to each other with specific roles and assign specific security types to related data allowing these roles to access this data.

The scenario shared by one of members connected a home PC with a door bell and initiated a phone call to a cellular phone of the owner when owner was out. The scenario included (as an option) video camera monitoring and was able to deliver owner voice response over IP to speakers located near the door. The scenario was also responsible for guest voice interception with the microphone to completely mimic phone conversation between remote owner and a guest near the door over IP and wireless technology. A part of the scenario was dedicated to voice recognition allowing to set several operations started by a voice, for example to start one of security sound clips. Joe copied the scenario from group space to his personal server space and downloaded a client portion to his home PC. Then Joe customized the scenario providing his cellular phone number and static IP address of his PC at home and was ready to use the scenario whenever he leaves his house unattended.

The above disclosure sets forth a number of embodiments of the present invention. Other arrangements or embodiments, not precisely set forth, could be practiced under the teachings of the present invention and as set forth in the following claims.

I claim:

1. A distributed knowledge and process base providing multiple-user access via a plurality of client devices to data, processes, and services, said base comprising:
   a plurality of distributed object technology systems (DOTS) communicating over a network and providing multi-level privilege-based access to a plurality of users via client devices, each of the DOTS having:
   (a) a plurality of system elements including processes, data, and services to users;
   (b) system methods associated with all system elements enabling addition of new system elements and modification of the functionality and content of existing system elements; said system methods also enabling:
      (i) creation and modification of user roles defining default settings limiting access and available functions for the role;
      (ii) assignment of roles to users and groups of users; and
      (iii) selected overriding of the default settings for individual users and groups of users; and an access controller providing access to system elements with the DOTS, and generating access negotiation requests to other DOTS based on user and group privileges and system element properties, wherein the access negotiation request includes at least data describing a requestor; requested system element and its owner; and a list of access negotiation requests by the requested system element owner toward system elements owned by the requester.

2. The distributed knowledge and process base of claim 1 wherein each system element has an assigned security type, access level, and usage property that reflects the frequency of usage of the system element and an evaluation grade by users.

3. The distributed knowledge and process base of claim 2 wherein system element usage properties comprise:
   (i) usage value summaries based on user evaluations and usage of the system element
   (ii) bookmarks set by individual users or groups to indicate favorite system elements;
   (iii) new usage indicators set to distinguish used system elements from new system elements for individual users or groups;
   (iv) trash flags indicating when a system element has been removed.

4. The distributed knowledge and process base of claim 1 wherein the system methods further enable:
   creation and modification of security types for system elements;
   assignment of default access levels and functions available for a role accessing a system element with a specific security type; and
   modification of system element usage properties based on user evaluation and usage of the system element.

5. The distributed knowledge and process base of claim 1 wherein each DOTS further comprises a core defining a unified set of system operations applicable to all system elements.

6. The distributed knowledge and process base of claim 1 wherein the services provided by the system elements are selected from the group consisting of an email service, an address book service, a calendar service, a linked knowledge service, a database, a file management service, a conference service, a task manager service, and a match-maker service.

7. The distributed knowledge and process base of claim 1 wherein each DOTS further comprises a thematic search controller to search for system elements with selected parameters.

8. The distributed knowledge and process base of claim 7 wherein the thematic search controller searches system elements across a plurality of DOTS.

9. The distributed knowledge and process base of claim 1 wherein the system methods are consistently defined across all of the DOTS.

10. The distributed knowledge and process base of claim 1 wherein at least one of the DOTS can be accessed by a user using a browser as the client device.

11. The distributed knowledge and process base of claim 1 wherein each DOTS further comprises a repeated actions scheduler enabling users to schedule periodic system operations.

12. The distributed knowledge and process base of claim 1 wherein at least one of the DOTS further comprises an action object defined by an executing environment descriptor and an action statement executable in this environment.

13. The distributed knowledge and process base of claim 1 wherein at least one of the DOTS further comprises a remote control scenario defined by a set of remote action objects and a sequence of conditional operations executed on the remote action objects.

14. The distributed knowledge and process base of claim 1 wherein at least one of the DOTS further comprises a notification block to notify users about selected events.

15. A distributed knowledge and process base providing multiple-user access via a plurality of client devices to data, processes, and services, said base comprising:
   a plurality of distributed object technology systems (DOTS) communicating over a network and providing multi-level privilege-based access to a plurality of users via client devices, each of the DOTS having:
      (a) a plurality of system elements including processes, data and services to users;
      (b) a core having:
         (i) an access controller providing privilege-based access by users to the system elements;
         (ii) a thematic search controller to search within a DOTS and across a plurality of DOTS for system elements with selected parameters; and said access controller further generating access negotiation requests to other DOTS based on user and group privileges and system element properties, wherein the access negotiation request includes at least data describing a requestor; requested system element and its owner; and a list of access negotiation requests by the requested system element owner toward system elements owned by the requester.

16. The distributed knowledge and process base of claim 15 wherein at least one of the DOTS can be accessed by a user using a browser as the client device.

17. The distributed knowledge and process base of claim 15 wherein the services provided by the system elements are selected from the group consisting of an email service, an address book service, a calendar service, a linked knowledge service, a database, a file management service, a conference service, a task manager service, and a match-maker service.

18. The distributed knowledge and process base of claim 15 further comprising system methods associated with each system element that are consistently defined across all of the DOTS.

19. A distributed knowledge and process base providing multiple-user access via a plurality of client devices to data, processes, and services, said base comprising:
   a plurality of distributed object technology systems (DOTS) communicating over a network and providing multi-level privilege-based access to a plurality of users via client devices, each of the DOTS having:
      (a) a plurality of system elements including processes, data, and services to users;
      (b) a core wherein system methods associated with system elements are consistently defined across all of the DOTS to enable addition of new system elements and modification of the functionality and content of existing system elements, creation and modification of user roles defining access limitations and available functions for the role, and assignment of roles to users and groups of users; said core having:
         (i) an access controller providing privilege-based access by users to the system elements; and
         (ii) a thematic search controller to search within a DOTS and across a plurality of DOTS for system elements with selected parameters; and said access controller further generating access negotiation requests to other DOTS based on user and group privileges and system element properties, wherein the access negotiation request includes at least data describing a requestor; requested system element and its owner; and a list of access negotiation requests by the requested system element owner toward system elements owned by the requester.

20. The distributed knowledge and process base of claim 19 wherein at least one of the DOTS can be accessed by a user using a browser as the client device.

21. The distributed knowledge and process base of claim 19 wherein the services provided by the system elements are selected from the group consisting of an email service, an address book service, a calendar service, a linked knowledge service, a database, a file management service, a conference service, a task manager service, and a match-maker service.

* * * * *